United States Patent
Kuriyama

(10) Patent No.: US 11,813,897 B2
(45) Date of Patent: Nov. 14, 2023

(54) PNEUMATIC TIRE

(71) Applicant: The Yokohama Rubber Co., LTD., Tokyo (JP)

(72) Inventor: Masatoshi Kuriyama, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 23 days.

(21) Appl. No.: 17/718,892

(22) Filed: Apr. 12, 2022

(65) Prior Publication Data

US 2022/0234395 A1 Jul. 28, 2022

Related U.S. Application Data

(62) Division of application No. 15/737,251, filed as application No. PCT/JP2016/070470 on Jul. 11, 2016, now Pat. No. 11,325,429.

(30) Foreign Application Priority Data

Jul. 22, 2015 (JP) ................. 2015-145224

(51) Int. Cl.
*B60C 13/02* (2006.01)
*B60C 3/04* (2006.01)
*B60C 13/00* (2006.01)

(52) U.S. Cl.
CPC ............... *B60C 13/02* (2013.01); *B60C 3/04* (2013.01); *B60C 2013/007* (2013.01)

(58) Field of Classification Search
CPC .. B60C 13/02; B60C 13/023; B60C 2013/007
See application file for complete search history.

(56) References Cited

U.S. PATENT DOCUMENTS

2012/0018071 A1 1/2012 Takahashi et al.
2012/0073719 A1 3/2012 Kurosawa
(Continued)

FOREIGN PATENT DOCUMENTS

EP 0652117 A1 5/1995
EP 0652118 A1 5/1995
(Continued)

OTHER PUBLICATIONS

English machine translation of JP 2006-213128 A, Aug. 17, 2006.*
(Continued)

*Primary Examiner* — Adrienne C. Johnstone
(74) *Attorney, Agent, or Firm* — Thorpe North & Western

(57) ABSTRACT

A tire has a tire center in the tire width direction. An intersection point of a carcass outer surface with a parallel line extending parallel with a rotation axis and passing through a tire maximum width position is denoted as P1. An intersection point of the parallel line LP with a side surface is denoted as P2. An intersection point of the parallel line with a protrusion portion outer surface of a protrusion portion is denoted as P3. A distance between the tire center and the intersection point P1 is denoted as W1. A distance between the tire center and the intersection point P3 is denoted as W3. A distance between the intersection point P1 and the intersection point P2 is denoted as G1. A distance between the intersection point P2 and the intersection point P3 is denoted as G2. $0.80 \leq W1/W3 \leq 0.95$ and $0.1 \leq G1/G2 \leq 1$.

6 Claims, 30 Drawing Sheets

(56) References Cited

U.S. PATENT DOCUMENTS

| | | |
|---|---|---|
| 2013/0076108 A1 | 3/2013 | Kubota et al. |
| 2014/0174623 A1 | 6/2014 | Mukai |
| 2016/0159149 A1 | 6/2016 | Kawashima et al. |

FOREIGN PATENT DOCUMENTS

| | | | |
|---|---|---|---|
| EP | 2676808 A1 | | 12/2013 |
| JP | 2006213128 A | * | 8/2006 |
| JP | 2008-265453 A | | 11/2008 |
| JP | 2010-247705 A | | 11/2010 |
| JP | 2012-066731 A | | 4/2012 |
| JP | 2013-071661 A | | 4/2013 |
| JP | 2014-125108 A | | 7/2014 |
| JP | 2015-033958 A | | 2/2015 |
| WO | WO 2010/119681 A1 | | 10/2010 |

OTHER PUBLICATIONS

International Search Report for International Application No. PCT/JP2016/070470 dated Oct. 4. 2016, 5 pages. Japan. [English translation included].

* cited by examiner

[EVALUATION TEST 1] WHEN G1/G2 IS 0.09

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | FAIL | FAIL | FAIL | FAIL | FAIL | FAIL | FAIL |
| TIRE WEIGHT REDUCTION RATIO | FAIL | FAIL | FAIL | FAIL | FAIL | FAIL | FAIL | FAIL |

FIG. 21

[EVALUATION TEST 1] WHEN G1/G2 IS 0.10

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | PASS | PASS | PASS | PASS | PASS | PASS | FAIL |
| TIRE WEIGHT REDUCTION RATIO | FAIL | PASS | PASS | PASS | PASS | PASS | PASS | FAIL |

FIG. 22

[EVALUATION TEST 1] WHEN G1/G2 IS 0.11

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | PASS | PASS | PASS | PASS | PASS | PASS | FAIL |
| TIRE WEIGHT REDUCTION RATIO | FAIL | PASS | PASS | PASS | PASS | PASS | PASS | FAIL |

FIG. 23

[EVALUATION TEST 1] WHEN G1/G2 IS 0.50

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | PASS | PASS | PASS | PASS | PASS | PASS | FAIL |
| TIRE WEIGHT REDUCTION RATIO | FAIL | PASS | PASS | PASS | PASS | PASS | PASS | FAIL |

FIG. 24

[EVALUATION TEST 1] WHEN G1/G2 IS 0.99

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | PASS | PASS | PASS | PASS | PASS | PASS | FAIL |
| TIRE WEIGHT REDUCTION RATIO | FAIL | PASS | PASS | PASS | PASS | PASS | PASS | FAIL |

FIG. 25

[EVALUATION TEST 1] WHEN G1/G2 IS 1.00

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | PASS | PASS | PASS | PASS | PASS | PASS | FAIL |
| TIRE WEIGHT REDUCTION RATIO | FAIL | PASS | PASS | PASS | PASS | PASS | PASS | FAIL |

FIG. 26

[EVALUATION TEST 1] WHEN G1/G2 IS 1.01

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | FAIL | FAIL | FAIL | FAIL | FAIL | FAIL | FAIL |
| TIRE WEIGHT REDUCTION RATIO | FAIL | FAIL | FAIL | FAIL | FAIL | FAIL | FAIL | FAIL |

FIG. 27

[EVALUATION TEST 2] WHEN G1 IS 0.99 mm

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | FAIL | FAIL | FAIL | FAIL | FAIL | FAIL | FAIL |
| TIRE WEIGHT REDUCTION RATIO | FAIL | FAIL | FAIL | FAIL | FAIL | FAIL | FAIL | FAIL |

FIG. 28

[EVALUATION TEST 2] WHEN G1 IS 1.00 mm

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | PASS | PASS | PASS | PASS | PASS | PASS | FAIL |
| TIRE WEIGHT REDUCTION RATIO | FAIL | PASS | PASS | PASS | PASS | PASS | PASS | FAIL |

FIG. 29

[EVALUATION TEST 2] WHEN G1 IS 1.01 mm

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | PASS | PASS | PASS | PASS | PASS | PASS | FAIL |
| TIRE WEIGHT REDUCTION RATIO | FAIL | PASS | PASS | PASS | PASS | PASS | PASS | FAIL |

FIG. 30

[EVALUATION TEST 2] WHEN G1 IS 2.00 mm

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | PASS | PASS | PASS | PASS | PASS | PASS | FAIL |
| TIRE WEIGHT REDUCTION RATIO | FAIL | PASS | PASS | PASS | PASS | PASS | PASS | FAIL |

FIG. 31

[EVALUATION TEST 2] WHEN G1 IS 2.49 mm

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | PASS | PASS | PASS | PASS | PASS | PASS | FAIL |
| TIRE WEIGHT REDUCTION RATIO | FAIL | PASS | PASS | PASS | PASS | PASS | PASS | FAIL |

FIG. 32

[EVALUATION TEST 2] WHEN G1 IS 2.50 mm

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | PASS | PASS | PASS | PASS | PASS | PASS | FAIL |
| TIRE WEIGHT REDUCTION RATIO | FAIL | PASS | PASS | PASS | PASS | PASS | PASS | FAIL |

FIG. 33

[EVALUATION TEST 2] WHEN G1 IS 2.51 mm

| W1/W3 | 0.79 | 0.80 | 0.81 | 0.85 | 0.90 | 0.94 | 0.95 | 0.96 |
|---|---|---|---|---|---|---|---|---|
| CUT RESISTANCE | FAIL | FAIL | FAIL | FAIL | FAIL | FAIL | FAIL | FAIL |
| TIRE WEIGHT REDUCTION RATIO | FAIL | FAIL | FAIL | FAIL | FAIL | FAIL | FAIL | FAIL |

FIG. 34

[EVALUATION TEST 3]

| x × SH | 0.09 | 0.10 | 0.11 | 0.39 | 0.40 | 0.41 | 0.50 | 0.60 |
|---|---|---|---|---|---|---|---|---|
| WEIGHT | PASS | PASS | PASS | PASS | PASS | FAIL | FAIL | FAIL |
| TIRE RIGIDITY | FAIL | PASS | PASS | PASS | PASS | PASS | PASS | PASS |

FIG. 35

[EVALUATION TEST 4]

| | 9 | 10 | 11 | 49 | 50 | 51 |
|---|---|---|---|---|---|---|
| WEIGHT REDUCTION | FAIL | PASS | PASS | PASS | PASS | FAIL |
| FUEL EFFICIENCY | FAIL | PASS | PASS | PASS | PASS | FAIL |

FIG. 36

[EVALUATION TEST 5]

|  | 0.49 | 0.50 | 4.99 | 5.00 | 5.01 |
|---|---|---|---|---|---|
| WEIGHT REDUCTION | FAIL | PASS | PASS | PASS | FAIL |
| FUEL EFFICIENCY | FAIL | PASS | PASS | PASS | FAIL |

FIG. 37

PNEUMATIC TIRE

RELATED APPLICATIONS

This application is a divisional of U.S. patent application Ser. No. 15/737,251, filed on Dec. 15, 2017, now U.S. Pat. No. 11,325,429, issued May 10, 2022, which is the National Stage of International Patent Application No. PCT/JP2016/070470, filed on Jul. 11, 2016, which claims the benefit of priority from Japan Patent Application No. 2015-145224, filed on Jul. 22, 2015.

TECHNICAL FIELD

The present technology relates to a pneumatic tire.

BACKGROUND ART

In a technical field relating to a pneumatic tire, development has been promoted to reduce the weight and rolling resistance of the pneumatic tire, in order to improve the fuel efficiency of a vehicle. Japanese Unexamined Patent Application Publication No. 2012-091731 discloses a technology that is designed to reduce the weight and rolling resistance of the pneumatic tire by extending a carcass folded back portion up to a point between a belt and a carcass main body portion, and consequently reducing the size of a rubber gage in a side portion.

SUMMARY

Due to the weight reduction of the pneumatic tire, there is a possibility that rigidity and cut resistance of the pneumatic tire may deteriorate. Thus, there is a demand for development of a pneumatic tire that achieves the weight reduction while suppressing the deterioration in the rigidity and the cut resistance.

The present technology provides a pneumatic tire that achieves weight reduction while suppressing deterioration of rigidity and cut resistance of the pneumatic tire.

According to the present technology, a pneumatic tire rotatable about a rotation axis is provided. Such a pneumatic tire includes a tread portion; side portions disposed on both sides of the tread portion in a tire width direction; a carcass including a carcass main body portion and a carcass folded back portion formed as a result of the carcass being folded back at a bead core; a side rubber connected to a carcass outer surface of the carcass main body portion and including a side surface on which a tire maximum width position is positioned; and a plurality of protrusion portions connected to the side surface, the protrusion portions protruding from the side surface and being disposed in a tire circumferential direction. At least one of the plurality of protrusion portions is connected to the side surface so as to include the tire maximum width position. Each of the plurality of protrusion portions includes a first end portion and a second end portion that is disposed on an outer side of the first end portion in a tire radial direction. A distance between the first end portion and the second end portion is larger than a short-direction maximum width of the protrusion portion in a plane orthogonal to the rotation axis. In a case that a tire center in the tire width direction is denoted as CL, an intersection point of a parallel line LP with the carcass outer surface is denoted as P1, the parallel line LP extending parallel with the rotation axis and passing through the tire maximum width position, an intersection point of the parallel line LP with the side surface is denoted as P2, an intersection point of the parallel line LP with a protrusion portion outer surface of the protrusion portion is denoted as P3 which is disposed in the outermost position in the tire width direction, a distance between the tire center CL and the intersection point P1 in a direction parallel with the rotation axis is denoted as W1, a distance between the tire center CL and the intersection point P2 in the direction parallel with the rotation axis is denoted as W2, a distance between the tire center CL and the intersection point P3 in the direction parallel with the rotation axis is denoted as W3, a distance between the intersection point P1 and the intersection point P2 is denoted as G1, and a distance between the intersection point P2 and the intersection point P3 is denoted as G2, the conditions of $$0.80 \leq W1/W3 \leq 0.95 \quad (1)$$

and $$0.1 \leq G1/G2 \leq 1 \quad (2)$$

are satisfied.

According to the present technology, as a result of the protrusion portions being provided on the side surface of the side rubber, even when a weight reduction is achieved by causing the distance G1, which indicates the thickness of the side rubber, to be smaller, a deterioration in rigidity and cut resistance is suppressed. Since the protrusion portions, each of which has a longitudinal shape, are connected to the side surface so as to include the tire maximum width position, and the plurality of the protrusion portions are provided in the tire circumferential direction, bending of the side portion is suppressed, and the side rubber is protected by the protrusion portions. As a result, the deteriorations in the rigidity and cut resistance of the pneumatic tire are suppressed. Further, as a result of the bending of the side portion being suppressed and the side rubber being protected, the carcass is sufficiently protected, and a deterioration of the carcass is thus suppressed.

Further, it is suitable that the carcass folded back portion do not extend as far as the tire maximum width position. Even when the carcass folded back portion does not extend as far as the tire maximum width position, the deteriorations in the rigidity and cut resistance of the pneumatic tire are suppressed by the protrusion portions. Further, by not extending the carcass folded back portion as far as the tire maximum width position, an increase in the weight of the pneumatic tire due to the carcass is suppressed.

Further, when a vehicle on which the pneumatic tires are mounted travels, air resistance at the tire maximum width position tends to become large. As a result of the longitudinal-shape protrusion portions being provided so as to include the tire maximum width position, an air distribution promotion effect and an air streamlining effect are obtained. As a result, air resistance is reduced, and fuel efficiency of the vehicle is thus improved.

The distance W1 corresponds to a carcass cross-sectional width S1, the distance W2 corresponds to a tire cross-sectional width S2, and the distance W3 corresponds to a total tire width S3. The carcass cross-sectional width S1 is equivalent to two times the distance W1, the tire cross-sectional width S2 is equivalent to two times the distance W2, and the total tire width S3 is equivalent to two times the distance W3. The distance G1 is a difference between the distance W2 and the distance W1, and the distance G2 is a difference between the distance W3 and the distance W2.

As a result of the distance W3 being defined, a pneumatic tire, which has a total tire width suitable for the vehicle on which the tire is mounted, is manufactured. As a result of the distance W3 being specified, the distance W1 is unequivocally determined by the condition (1). When W1/W3 is larger than 0.95, a distance between the carcass outer surface and the protrusion portion outer surface becomes too short, and the carcass 2 is not sufficiently protected. When W1/W3 is smaller than 0.80, the distance between the carcass outer surface and the protrusion portion outer surface becomes too large, and the weight reduction of the pneumatic tire becomes difficult. By satisfying the condition (1), the weight reduction is achieved while sufficiently protecting the carcass.

As a result of the distance W1 and the distance W3 being determined, the distance W2 is unequivocally determined by the condition (2). The distance G1 indicates the thickness of the side rubber, and the distance G2 indicates the height of the protrusion portion. When G1/G2 is smaller than 0.1, the thickness of the side rubber becomes too thin, and the carcass is not sufficiently protected. When G1/G2 is larger than 1, the thickness of the side rubber becomes larger than the height of the protrusion portion, and the weight reduction of the pneumatic tire becomes difficult. By satisfying the condition (2) as well as the condition (1), the weight reduction of the pneumatic tire is achieved while suppressing the deterioration in the rigidity and cut resistance of the pneumatic tire.

According to the present technology, a pneumatic tire rotatable about a rotation axis is provided. Such a pneumatic tire includes a tread portion; side portions disposed on both sides of the tread portion in a tire width direction; a carcass including a carcass main body portion and a carcass folded back portion formed as a result of the carcass being folded back at a bead core; a side rubber connected to a carcass outer surface of the carcass main body portion and including a side surface on which a tire maximum width position is positioned; and a plurality of protrusion portions connected to the side surface, the protrusion portions protruding from the side surface and being disposed in a tire circumferential direction. At least one of the plurality of protrusion portions is connected to the side surface so as to include the tire maximum width position. Each of the plurality of protrusion portions includes a first end portion and a second end portion that is disposed on an outer side of the first end portion in a tire radial direction. A distance between the first end portion and the second end portion is larger than a short-direction maximum width of the protrusion portion in a plane orthogonal to the rotation axis. In a case that a tire center in the tire width direction is denoted as CL, an intersection point of a parallel line LP with the carcass outer surface is denoted as P1, the parallel line LP extending parallel with the rotation axis and passing through the tire maximum width position, an intersection point of the parallel line LP with the side surface is denoted as P2, an intersection point of the parallel line LP with a protrusion portion outer surface of the protrusion portion is denoted as P3 which is disposed in the outermost position in the tire width direction, a distance between the tire center CL and the intersection point P1 in a direction parallel with the rotation axis is denoted as W1, a distance between the tire center CL and the intersection point P2 in the direction parallel with the rotation axis is denoted as W2, a distance between the tire center CL and the intersection point P3 in the direction parallel with the rotation axis is denoted as W3, a distance between the intersection point P1 and the intersection point P2 is denoted as G1, and a distance between the intersection point P2 and the intersection point P3 is denoted as G2, the conditions of $$0.80 \leq W1/W3 \leq 0.95 \quad \text{(3) and}$$

$$1.0 \text{ mm} \leq G1 \leq 2.5 \text{ mm} \quad \text{(4) are satisfied.}$$

According to the present technology, as a result of the distance W3 being determined, the distance W1 is unequivocally determined by the condition (3). By satisfying the condition (3), the weight reduction of the pneumatic tire is achieved while suppressing the deterioration in the rigidity and cut resistance of the pneumatic tire. The distance G1 indicates the thickness of the side rubber. A side rubber gage of a tire in the related art is thicker than 2.5 mm. As a result of making the distance G1 to be 2.5 mm or less, which is smaller than the side rubber gage of the tire in the related art, the weight reduction of the pneumatic tire is achieved. When the distance G1 is smaller than 1.0 mm, the thickness of the side rubber 8 becomes too thin. Thus, the carcass 2 is not sufficiently protected. By satisfying the condition (4) as well as the condition (3), the weight reduction is achieved while sufficiently protecting the carcass.

In the present technology, it is suitable that all of the plurality of protrusion portions be connected to the side surface so as to include the tire maximum width position.

As a result of all of the plurality of protrusion portions being provided so as to include the tire maximum width position, bending of the side portion is sufficiently suppressed at the tire maximum width position, and the side rubber and the carcass are sufficiently protected. Further, the air resistance is reduced, and consequently, the fuel efficiency of the vehicle is improved.

In the present technology, when a tire cross-sectional height, which indicates a distance between an innermost end portion and an outermost end portion in the tire radial direction, is denoted as SH, it is suitable that the protrusion portions be provided within a range of from 0.1×SH to 0.4×SH in the tire radial direction.

In a range in which the tire cross-sectional height is larger than 0.4×SH, the protrusion portions reach outer regions of the side portions. Consequently, the weight of the pneumatic tire simply increases, while no significant improvement in functions of the protrusion portions (namely, a rigidity reduction suppression function, a cut resistance reduction suppression function, and a carcass protection function) is expected. In a range in which the tire cross-sectional height is smaller than 0.1×SH, the carcass protection function is not sufficiently used. As a result of the protrusion portions being provided in the range of from 0.1×SH to 0.4×SH, the functions of the protrusion portions are fully used while achieving the weight reduction of the pneumatic tire.

In the present technology, the number of the protrusion portions disposed on the side surface in the tire circumferential direction is suitably in a range of from 10 to 50.

When the number of protrusions is less than 10, the air distribution promotion effect and the air streamlining effect are not sufficiently obtained. When the number of protrusion portions is more than 50, the protrusion portions themselves become a source of air resistance, and the air distribution promotion effects and the air streamlining effects are not sufficiently obtained. Further, when the number of protrusion portions is too large, the weight of the pneumatic tire increases. As a result of setting the number of protrusion portions to be in the range of from 10 to 50, the air resistance and the fuel efficiency of the vehicle is improved while suppressing the increase in the weight of the pneumatic tire.

In the present technology, it is suitable that the short-direction maximum width of the protrusion portion be in a range of from 0.5 mm to 5.0 mm.

When the short-direction maximum width of the protrusion portion is less than 0.5 mm, the protrusion portion easily deforms and becomes difficult to obtain the air distribution promotion effect and the air streamlining effect.

When the short-direction maximum width of the protrusion portion is greater than 5.0 mm, the protrusion portion itself becomes a source of air resistance, and the air distribution promotion effect and the air streamlining effect are not sufficiently obtained. Further, when the protrusion portion is too thick, the weight of the pneumatic tire increases. As a result of the short-direction maximum width of the protrusion portion being set to be in a range of from 0.5 mm to 5.0 mm or less, the air resistance and the fuel efficiency of the vehicle is improved while suppressing the increase in the weight of the pneumatic tire.

In the present technology, it is suitable that a plurality of recessed portions be provided, in the side surface, between the protrusion portions that are adjacent to each other.

As a result, the air resistance of the vehicle is further reduced, and the fuel efficiency of the vehicle is thus improved. As a result of the recessed portions being provided in addition to the protrusion portions, the air flowing from the front side to the rear side of the vehicle becomes turbulent. As a result, a turbulent flow boundary layer is generated in the periphery of the pneumatic tire, and an expansion of the air is suppressed. As a result of the expansion of the air passing the vehicle being suppressed, the air resistance of the vehicle is reduced, and the fuel efficiency of the vehicle is thus improved.

According to an aspect of the present technology, provided is a pneumatic tire that achieves weight reduction while suppressing deterioration in rigidity and cut resistance of the pneumatic tire.

BRIEF DESCRIPTION OF DRAWINGS

FIG. 21 is a table showing results of evaluation tests on tires according to the present technology.

FIG. 22 is a table showing results of evaluation tests on the tires according to the present technology.

FIG. 23 is a table showing results of evaluation tests on the tires according to the present technology.

FIG. 24 is a table showing results of evaluation tests on the tires according to the present technology.

FIG. 25 is a table showing results of evaluation tests on the tires according to the present technology.

FIG. 26 is a table showing results of evaluation tests on the tires according to the present technology.

FIG. 27 is a table showing results of evaluation tests on the tires according to the present technology.

FIG. 28 is a table showing results of evaluation tests on the tires according to the present technology.

FIG. 29 is a table showing results of evaluation tests on the tires according to the present technology.

FIG. 30 is a table showing results of evaluation tests on the tires according to the present technology.

FIG. 31 is a table showing results of evaluation tests on the tires according to the present technology.

FIG. 32 is a table showing results of evaluation tests on the tires according to the present technology.

FIG. 33 is a table showing results of evaluation tests on the tires according to the present technology.

FIG. 34 is a table showing results of evaluation tests on the tires according to the present technology.

FIG. 35 is a table showing results of evaluation tests on the tires according to the present technology.

FIG. 36 is a table showing results of evaluation tests on the tires according to the present technology.

FIG. 37 is a table showing results of evaluation tests on the tires according to the present technology.

DETAILED DESCRIPTION

Embodiments according to the present technology will be described below with reference to the drawings. However, the present technology is not limited to those embodiments. The constituents of the embodiments described below can be combined with one another as appropriate. In addition, some of the constituents may not be used in some cases.

First Embodiment

Figure 1:
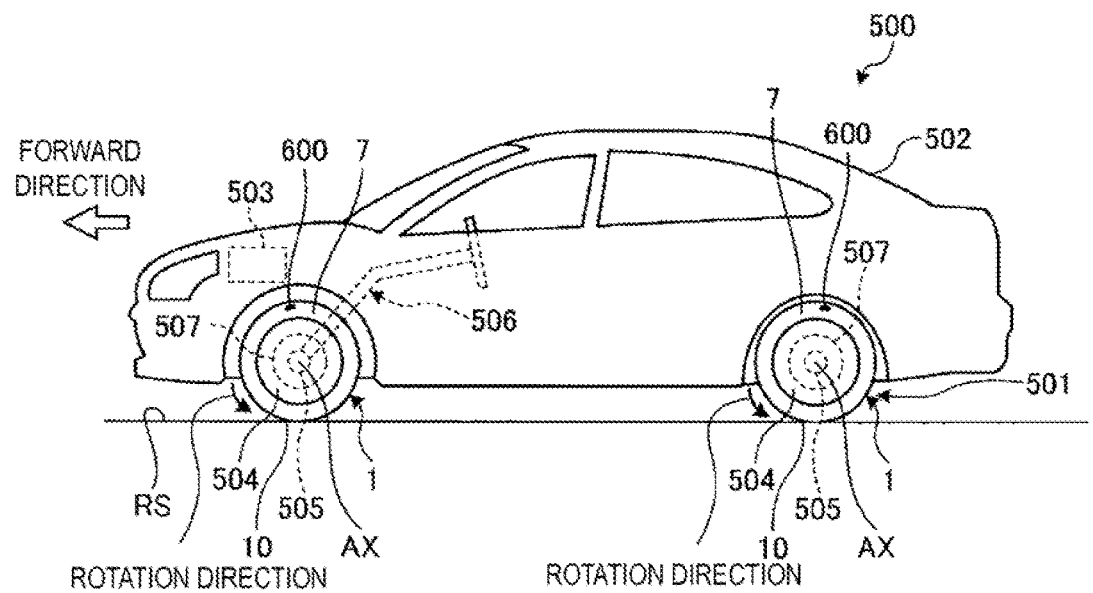
FIG. 1 is a side view illustrating an example of a vehicle according to a first embodiment.
Figure 2:
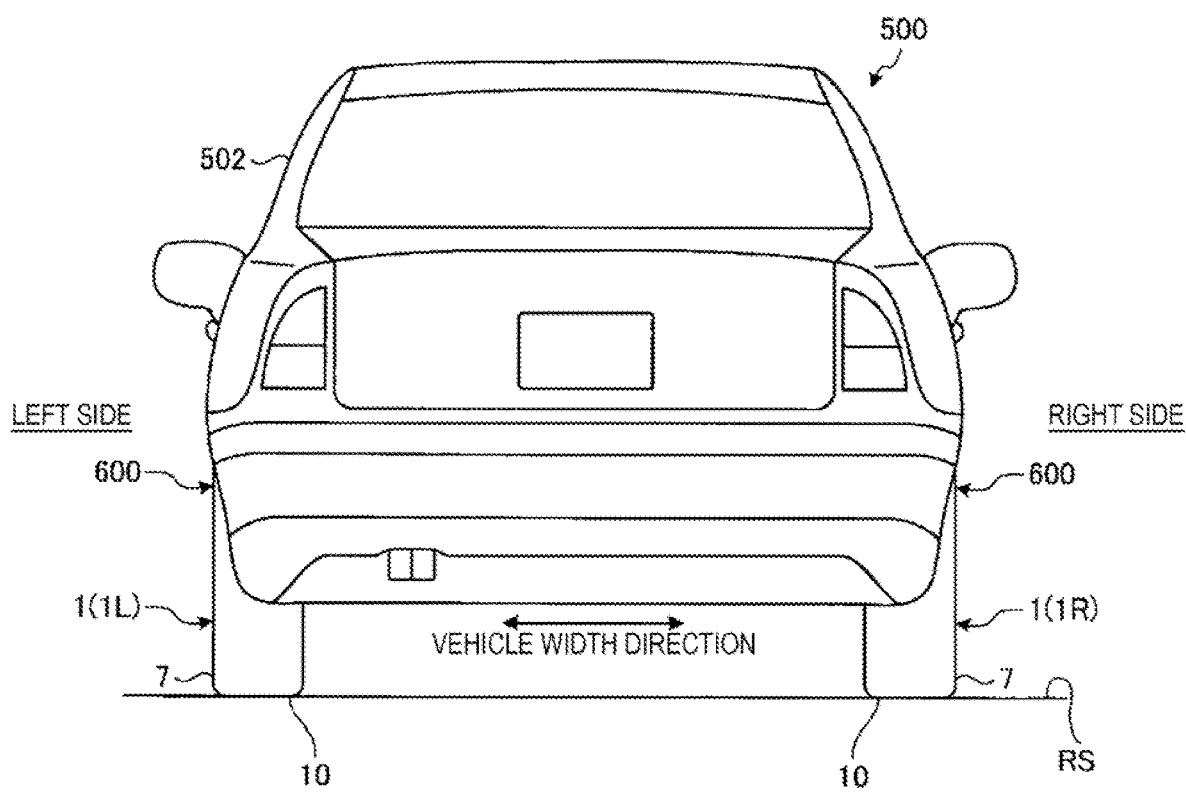
FIG. 2 is a rear view of the vehicle according to the first embodiment.

A first embodiment will now be described. FIG. 1 is a side view illustrating an example of a vehicle 500 according to the present embodiment. FIG. 2 is a rear view of the vehicle 500 according to the present embodiment. Tires 1 are mounted on the vehicle 500. The tires 1 are pneumatic tires. The tires 1 mounted on the vehicle 500 rotate about a rotation axis AX and travel on a road surface RS.

Herein, a tire circumferential direction, a tire radial direction, and a tire width direction will be used as terms to explain the positional relationships between the components. The tire circumferential direction refers to a rotation direction about the rotation axis AX of the tire 1. The tire radial direction refers to a radiation direction out from the rotation axis AX of the tire 1. The tire width direction refers to a direction parallel with the rotation axis AX of the tire 1.

As illustrated in FIG. 1 and FIG. 2, the vehicle 500 is provided with a driving apparatus 501 that includes the tires 1, a vehicle body 502 that is supported by the driving apparatus 501, and an engine 503 for driving the driving apparatus 501.

The driving apparatus 501 includes wheels 504 that support the tires 1, axle shafts 505 that support the wheels 504, a steering apparatus 506 for changing an advancement direction of the driving apparatus 501, and a brake apparatus 507 for decelerating or stopping the driving apparatus 501.

The vehicle body 502 has a driver cab that is occupied by a driver. An accelerator pedal for adjusting the output of the engine 503, a brake pedal for activating the braking apparatus 507, and a steering wheel for operating the steering apparatus 506 are disposed in the driver cab. The driver operates the accelerator pedal, the brake pedal, and the steering wheel. The vehicle 500 travels as a result of the operations of the driver.

The vehicle 500 is a four-wheeled vehicle. The driving apparatus 501 includes a front left wheel and a rear left wheel that are provided on the left side of the vehicle body 502 and a front right wheel and a rear right wheel that are provided on the right side of the vehicle body 502. The tires 1 include left tires 1L mounted on the left side of the vehicle body 502 and right tires 1R mounted on the right side of the vehicle body 502.

Each of the tires 1 includes a tread portion 10 that comes into contact with the road surface RS and side portions 7 that are disposed on both sides of the tread portion 10 in the tire width direction. The rotation direction of the tires 1 about the rotation axis AX is designated. Specifically, the tires 1 are mounted on the vehicle 500 so as to rotate in the designated rotation direction about the rotation axis AX when the vehicle 500 moves forward. The left tires 1L mounted on the left side of the vehicle 500 rotate in the designated rotation direction when the vehicle 500 moves forward. The right tires 1R mounted on the right side of the vehicle 500 rotate in the designated rotation direction when the vehicle 500 moves forward.

A mark 600, which indicates the rotation direction of the tire 1 or a mounting position of the tire 1 with respect to the vehicle 500, is provided on the side portion 7 of the tire 1. The mark 600 may be an arrow that indicates the rotation direction, or alphanumerics such as "OUTSIDE". On the basis of the marks 600, the tires 1 are mounted on the vehicle 500 so as to rotate in the designated rotation direction about the rotation axis AX when the vehicle 500 moves forward.

Figure 3:
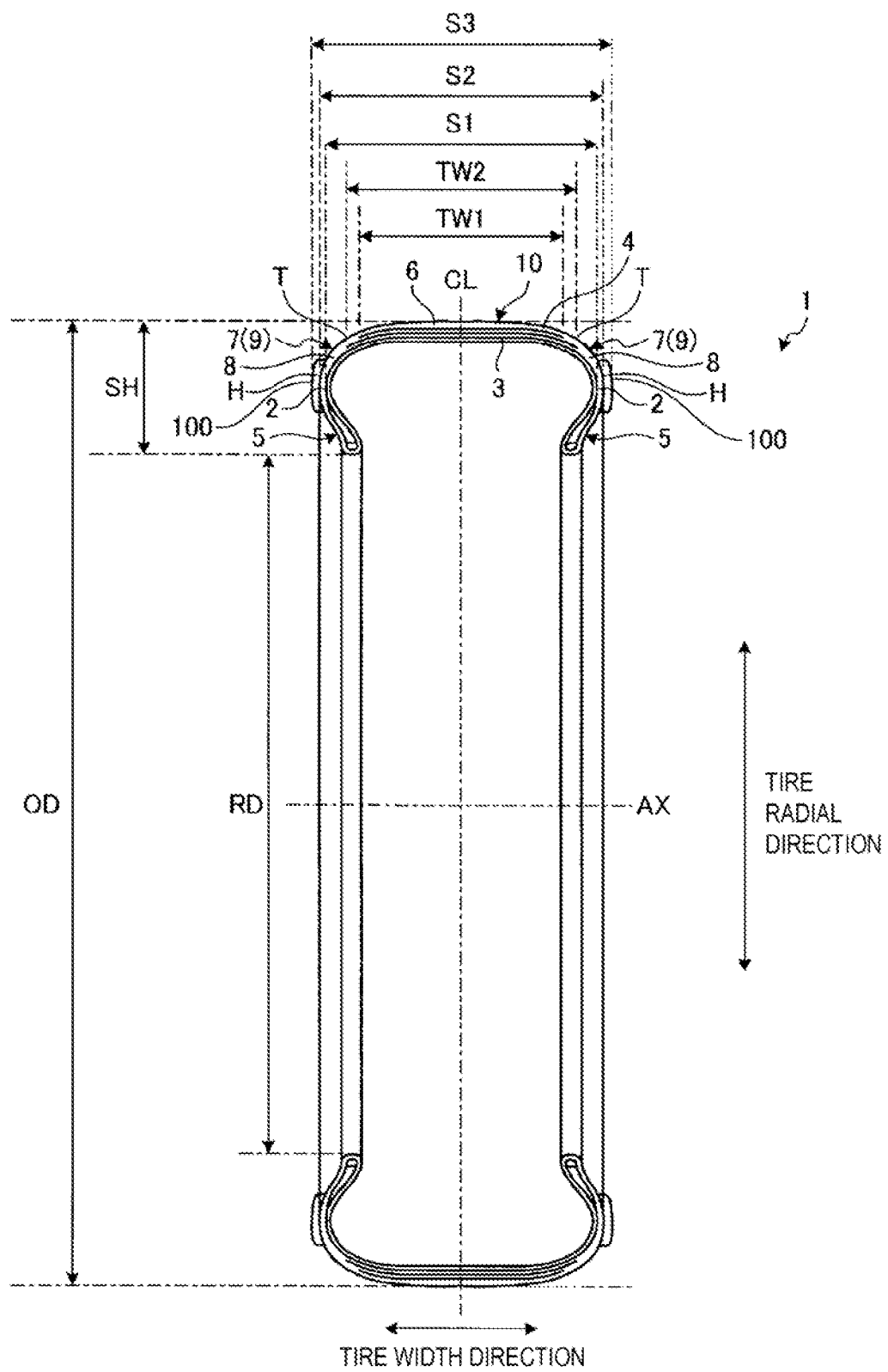
FIG. 3 is a cross-sectional view illustrating an example of a pneumatic tire according to the first embodiment.
Figure 4:
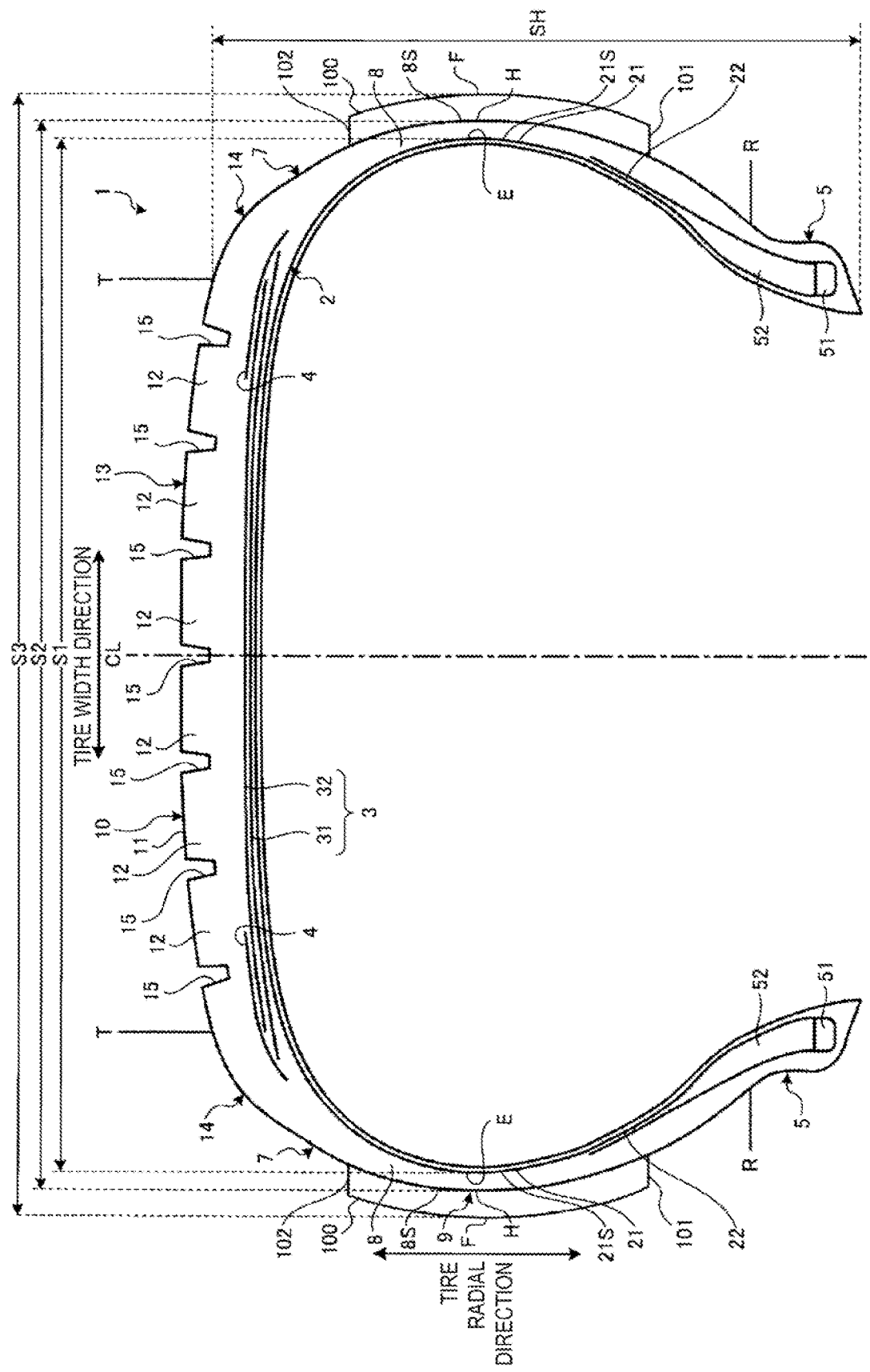
FIG. 4 is a meridian cross-sectional view illustrating a part of the pneumatic tire according to the first embodiment.

Next, the tire 1 according to the present embodiment will be described. FIG. 3 is a cross-sectional view illustrating an example of the tire 1 according to the present embodiment. FIG. 4 is a cross-sectional view illustrating a part of the tire 1 according to the present embodiment. The tire 1 is a pneumatic tire. The tire 1 is rotatable about the rotation axis AX. FIG. 3 and FIG. 4 illustrate meridian cross-sections of the tire 1 taken along the rotation axis AX. The rotation axis AX of the tire 1 is orthogonal to a tire equatorial plane CL of the tire 1.

Herein, the rotation direction of the tire 1 about the rotation axis AX is also referred to as the tire circumferential direction when appropriate, a radiation direction with respect to the rotation direction AX is also referred to as the tire radial direction when appropriate, and a direction parallel with the rotation axis AX is also referred to as the tire width direction when appropriate. Further, herein, the tire equatorial plane CL is also referred to as a tire center CL when appropriate. The tire center CL refers to a center of the tire 1 in the tire width direction.

In the present embodiment, the outer side in the tire width direction refers to a direction away from the tire center CL in the tire width direction. The inner side in the tire width direction refers to a direction toward the tire center CL in the tire width direction. The outer side in the tire radial direction refers to a direction away from the rotation axis AX in the tire radial direction. The inner side in the tire radial direction refers to a direction toward the rotation axis AX in the tire radial direction.

The tire 1 includes a carcass 2, a belt layer 3, a belt cover 4, bead portions 5, a tread portion 10, and the side portions 7 that include sidewall portions 9, and protrusion portions 100 provided on the side portions 7. The tread portion 10 includes a tread rubber 6. Each of the side portion 7 includes a side rubber 8. The protrusion portions 100 are formed of rubber, for example.

A tire outer diameter OD, which indicates the outer diameter of the tire 1, refers to the diameter of the tire 1 measured when the tire 1 is mounted on a regular rim, inflated to a regular internal pressure, and in an unloaded state in which no load is applied to the tire 1.

A tire rim diameter RD, which indicates a rim diameter of the tire 1, refers to a rim diameter of a wheel compatible with the tire 1. The tire rim diameter RD is equal to the tire inner diameter.

A tire cross-sectional height SH, which indicates a cross-sectional height of the tire 1, refers to a distance between an innermost end portion of the tire 1 and an outermost end portion of the tire 1 in the tire radial direction measured when the tire 1 is mounted on the regular rim, inflated to the regular internal pressure, and in the unloaded state in which no load is applied to the tire 1.

A tread contact width TW1, which indicates a ground contact width of the tread portion 10, refers to the maximum value of the ground contact width in the tire width direction measured when the tire 1 is mounted on the regular rim, inflated to the regular internal pressure, and in a loaded state in which the tire 1 is placed vertically on a flat surface with a regular load applied to the tire 1. Specifically, the tread contact width TW1 refers to a distance, in the tire width direction, between a ground contact edge T of the tread portion 10 on one side of the tire center CL and a ground contact edge T of the tread portion 10 on the other side of the tire center CL.

The tire ground contact edge T of the tread portion 10 refers to an end portion, in the tire width direction, of a portion of the tread portion 10 that comes into contact with the ground when the tire 1 is mounted on the regular rim, inflated to the regular internal pressure, and in the loaded state in which the tire 1 is placed vertically on a flat surface with the regular load applied to the tire 1.

A developed tread width TW2, which indicates a developed width of the tread portion 10, refers to a linear distance between both ends of the tread portion 10 of the tire 1 in a developed view, measured when the tire 1 is mounted on the regular rim, inflated to the regular internal pressure, and in the unloaded state in which no load is applied to the tire 1.

A carcass cross-sectional width S1, which indicates a cross-sectional width of the carcass 2, refers to the maximum dimension of the carcass 2 in the tire width direction, measured when the tire 1 is mounted on the regular rim, inflated to the regular internal pressure, and in the unloaded state in which no load is applied to the tire 1. Specifically, the carcass cross-sectional width S1 refers to a distance between a carcass maximum width position E that indicates an outermost portion of the carcass 2 disposed on the one side of the tire center CL in the tire width direction, and a carcass maximum width position E that indicates an outermost portion of the carcass 2 disposed on the other side of the tire center CL in the tire width direction.

A tire cross-sectional width S2, which indicates a cross-sectional width of the tire 1, refers to the maximum dimension of the tire 1 in the tire width direction, excluding structural components protruding from the surfaces of the side portions 7, when the tire 1 is mounted on the regular rim, inflated to the regular internal pressure, and in the unloaded state in which no load is applied to the tire 1. In the present embodiment, the protrusion portions 100 are provided as the structural components protruding from the surfaces of the side portions 7. The tire cross-sectional width S2 refers to a distance between a tire maximum width position H that indicates an outermost portion of the side portion 7 disposed on the one side of the tire center CL in the tire width direction, and a tire maximum width position H that indicates an outermost portion of the side portion 7 disposed on the other side of the tire center CL in the tire width direction, when excluding the protrusion portions 100.

Note that examples of the structural components protruding from the surfaces of the side portions 7 include alphanumerics, marks, and patterns formed by the side rubbers 8. Note that a rim protection bar, which protects the rim, may be provided on the tire 1 in some cases. The rim protection bar is provided in the tire circumferential direction and protrudes toward the outer side in the tire width direction. In the tire 1 on which the rim protection bar is provided, the rim protection bar includes an outermost portion of the tire 1 in the tire width direction. In this case, the tire cross-sectional width S2 is a dimension excluding the rim protection bar.

A total tire width S3, which indicates the total width of the tire 1, refers to the maximum dimension of the tire 1 in the tire width direction, measured when the tire 1 is mounted on the regular rim, inflated to the regular internal pressure, and in the unloaded state in which no load is applied to the tire 1. Specifically, the total tire width S3 refers to a distance between an outermost portion of the structural components configuring the tire 1 and disposed on the one side of the tire center CL in the tire width direction, and an outermost portion of the structural components configuring the tire 1 and disposed on the other side of the tire center CL in the tire width direction. In the present embodiment, the protrusion portions 100, which protrude from the surfaces of the side portions 7, are provided. The total tire width S3 refers to a distance between a protrusion portion maximum width position F that indicates an outermost portion of the protrusion portions 100 disposed on the one side of the tire center CL in the tire width direction, and the protrusion portion maximum width position F that indicates an outermost portion of the protrusion portions 100 disposed on the other side of the tire center CL in the tire width direction.

"Regular rim" is a rim defined by a standard for each of the tires 1 according to a system of standards that includes standards on which the tires 1 are based, and refers to a "standard rim" in the case of the Japan Automobile Tyre Manufacturers Association (JATMA), refers to a "Design Rim" in the case of the Tire and Rim Association (TRA), and refers to a "Measuring Rim" in the case of the European Tyre and Rim Technical Organisation (ETRTO). However, if the tire 1 is an original equipment tire, the genuine wheel on which the tire 1 is to be mounted is used as the regular rim.

"Regular internal pressure" is an air pressure defined by a standard for each of the tires 1 according to a system of standards that includes standards on which the tires 1 are based, and refers to a "maximum air pressure" in the case of JATMA, refers to a maximum value in a table of "TIRE ROAD LIMITS AT VARIOUS COLD INFLATION PRESSURES" in the case of TRA, and refers to an "INFLATION PRESSURE" in the case of ETRTO. However, if the tire 1 is an original equipment tire, the air pressure indicated on the vehicle is used as the regular internal pressure.

"Regular load" is a load defined by a standard for each of the tires 1 according to a system of standards that includes standards on which the tires 1 are based, and refers to a "maximum load capacity" in the case of JATMA, to a maximum value in a table of "TIRE LOAD LIMITS AT VARIOUS COLD INFLATION PRESSURES" in the case of TRA, and to a "LOAD CAPACITY" in the case of ETRTO. However, if the tire 1 is mounted on a passenger vehicle, a load corresponding to 88% of the above-described load is used as the regular load. If the tire 1 is an original equipment tire, the wheel load, which is obtained by dividing the front and rear axle loads stated in the vehicle inspection certificate of the vehicle by the number of tires, is used as the regular load.

The carcass 2 is a reinforcing member that forms the framework of the tire 1. The carcass 2 includes carcass cords and functions as a pressure vessel when the tire 1 is filled with air. The carcass 2 includes the carcass cords made of organic fibers and rubber that covers the carcass cords. Note that the carcass 2 may include the carcass cords made of polyester, the carcass cords made of nylon, the carcass cords made of aramid, and the carcass cords made of rayon.

The bead portions 5 are reinforcing members that support the carcass 2. The bead portions 5 are disposed on both sides of the carcass 2 in the tire width direction and support both end portions of the carcass 2. The carcass 2 is folded back at bead cores 51 of the bead portions 5. The bead portions 5 fix the tire 1 to a rim. The bead portion 5 includes the bead core 51 and a bead filler 52.

The carcass 2 includes a carcass main body portion 21 and carcass folded back portions 22 that are formed as a result of the carcass 2 being folded back at the bead cores 51. The carcass folded back portions 22 are portions that are disposed further toward the outer side in the tire width direction than the carcass main body portion 21, as a result of the carcass 2 being folded back at the bead cores 51. The bead core 51 is a member formed by a bead wire being wound into a ring shape. The bead wire is a steel wire. The bead filler 52 is a rubber material that is disposed in a space formed between the carcass main body portion 21 and the carcass folded back portion 22, as a result of the carcass 2 being folded back at the bead core 51.

The belt layer 3 is a reinforcing member that retains the shape of the tire 1. The belt layer 3 includes belt cords and is disposed between the carcass 2 and the tread rubber 6. The belt layer 3 includes the belt cords made of steel fibers and rubber that covers the belt cords. Note that the belt layer 3 may include the belt cords made of organic fibers. The belt layer 3 includes a first belt ply 31 and a second belt ply 32.

The first belt ply 31 and the second belt ply 32 are layered such that the belt cords of the first belt ply 31 intersect with the belt cords of the second belt ply 32.

The belt cover 4 is a reinforcing member that protects and reinforces the belt layer 3. The belt cover 4 includes cover cords and is disposed on the outer side of the belt layer 3 with respect to the rotation axis AX of the tire 1. The belt cover 4 includes the cover cords made of metal fibers and rubber that covers the cover cords. Note that the belt cover 4 may include the cover cords made of organic fibers.

The tread rubber 6 protects the carcass 2. The tread portion 10 includes the tread rubber 6 in which a plurality of grooves 15 are provided. The tread portion 10 includes land portions 12 disposed between the grooves 15, and each of the land portions 12 has a ground contact surface (a road contact surface) 11 that comes into contact with the road surface. The grooves 15 include a plurality of main grooves disposed in the tire circumferential direction and lug grooves, at least part of which are disposed in the tire width direction.

The tread portion 10 includes a center portion 13 that includes the tire center CL and shoulder portions 14 that are provided on both sides of the center portion 13 in the tire width direction. The main grooves are provided in both the center portion 13 and the shoulder portions 14. The lug grooves are also provided in both the center portion 13 and the shoulder portions 14.

The sidewall rubbers 8 protect the carcass 2. The side portions 7 include the side rubbers 8 and are disposed on both sides of the tread portion 10 in the tire width direction. Of the side portion 7, the sidewall portion 9 includes a portion bulging most outwardly in the tire width direction. With respect to the tire center CL, the surface of the side portion 7 is disposed further to the outer side than the ground contact edge T of the tread portion 10.

The surface of the side portion 7 includes a side surface 8S, which is the surface of the side rubber 8. The side surface 8S is a surface of the side portion 7 positioned between the ground contact edge T of the tread portion 10 and a rim check line R. The ground contact edge T includes a boundary between the shoulder portion 14 of the tread portion 10 and the side portion 7. The rim check line R is a line that is used to confirm whether or not the tire 1 is correctly mounted on the rim. Typically, the rim check line R is an annular convex line that is disposed further on the outer side in the tire radial direction than a rim flange and continues in the tire circumferential direction along the rim flange on the surface of the bead portion 5.

The protrusion portion 100 is connected to the side surface 8S and protrudes outward in the tire width direction from the side surface 8S. The protrusion portion 100 includes a protrusion portion outer surface 100S that is oriented outward in the tire width direction. A plurality of the protrusion portions 100 are provided on the side surfaces 8S.

Figure 5:
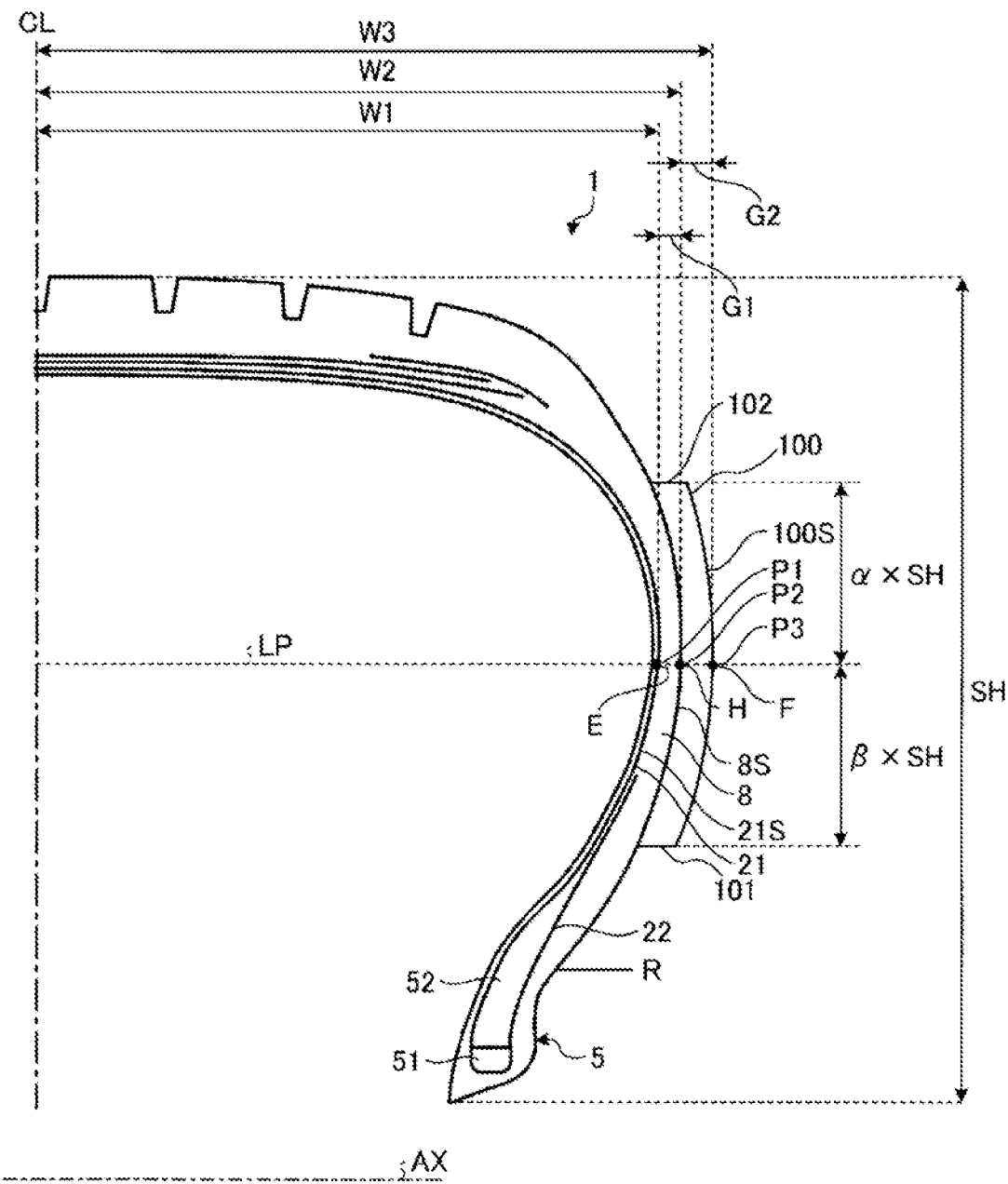
FIG. 5 is a diagram illustrating a part of the pneumatic tire according to the first embodiment.

FIG. 5 is an enlarged view of a part of FIG. 4. As illustrated in FIG. 4 and FIG. 5, the carcass main body portion 21 includes carcass outer surfaces 21S that is oriented outward in the tire width direction. The side rubbers 8 are connected to the carcass outer surfaces 21S of the carcass main body portion 21. The protrusion portions 100 are connected to the side surfaces 8S of the side rubbers 8. The carcass maximum width positions E are positioned on the carcass outer surfaces 21S of the carcass main body portion 21. The tire maximum width positions H are positioned on the side surfaces 8S of the side rubbers 8. The protrusion portion maximum width positions F are positioned on the protrusion portion outer surfaces 100S of the protrusion portions 100.

The plurality of protrusion portions 100 are disposed in the tire circumferential direction on the side surfaces 8 between the ground contact edge T and the rim check line R.

The protrusion portions 100 are connected to the side surfaces 8S so as to include the tire maximum width positions H. Each of the protrusion portions 100 is formed in a longitudinal shape that includes a first end portion 101 and a second end portion 102 that is disposed further to the outer side in the tire radial direction than the first end portion 101. A central portion of the protrusion portion 100 between the first end portion 101 and the second end portion 102 is disposed on the tire maximum width position H.

As illustrated in FIG. 5, a line that extends in parallel to the rotation axis AX and passes through the tire maximum width positions H is denoted as a parallel line LP. In the present embodiment, the parallel line LP passes through the carcass maximum width positions E, the tire maximum width positions H, and the protrusion portion maximum width positions F.

An end portion of the carcass folded back portion 22 is suitably formed so as to be disposed further to the inner side in the tire radial direction than the parallel line LP that includes the carcass maximum width positions E, the tire maximum width positions H, and the protrusion portion maximum width positions F.

An intersection point of the parallel line LP with the carcass outer surface 21S is denoted as P1, an intersection point of the parallel line LP with the side surface 8S is denoted as P2, and an intersection point of the parallel line LP with the protrusion portion outer surface 100S is denoted as P3. The intersection point P1 is positioned at the carcass maximum width position E, which is disposed at the outermost position in the tire width direction of the carcass outer surface 21S. The intersection point P2 is positioned at the tire maximum width position H, which is disposed at the outermost position in the tire width direction of the side surface 8S. The intersection point P3 is positioned at the protrusion portion maximum width position F, which is disposed at the outermost position in the tire width direction of the protrusion portion outer surface 100S.

A distance between the tire center CL and the intersection point P1 with respect to the direction parallel with the rotation axis AX is denoted as W1, a distance between the tire center CL and the intersection point P2 with respect to the direction parallel with the rotation axis AX is denoted as W2, and a distance between the tire center CL and the intersection point P3 with respect to the direction parallel with the rotation axis AX is denoted as W3. Further, a distance between the intersection point P1 and the intersection point P2 is denoted as G1, and a distance between the intersection point P2 and the intersection point P3 is denoted as G2.

The carcass cross-sectional width S1 is equivalent to two times the distance W1, the tire cross-sectional width S2 is equivalent to two times the distance W2, and the total tire width S3 is equivalent to two times the distance W3. The distance G1 is a difference between the distance W2 and the distance W1, and the distance G2 is a difference between the distance W3 and the distance W2. Specifically, the following relationships are established: $2 \times W1 = S1$, $2 \times W2 = S2$, $2 \times W3 = S3$, $G1 = W2 - W1$, and $G2 = W3 - W2$.

In the present embodiment, the distance W1, the distance W2, and the distance W3 are set so as to satisfy the following conditions:

$$0.80 \leq W1/W3 \leq 0.95; \text{ and} \quad (1)$$

$$0.1 \leq G1/G2 \leq 1. \quad (2)$$

The protrusion portions 100 are provided in a range of from 0.1×SH to 0.4×SH in the tire radial direction. In the present embodiment, as illustrated in FIG. 5, the protrusion portion 100 is provided so as to extend in a range of α×SH or less from the tire maximum width position H toward the outer side in the tire radial direction, and is also provided so as to extend in a range of β×SH or less from the tire maximum width position H toward the inner side in the tire radial direction. It is suitable that α and β be equal to each other.

Figure 6:
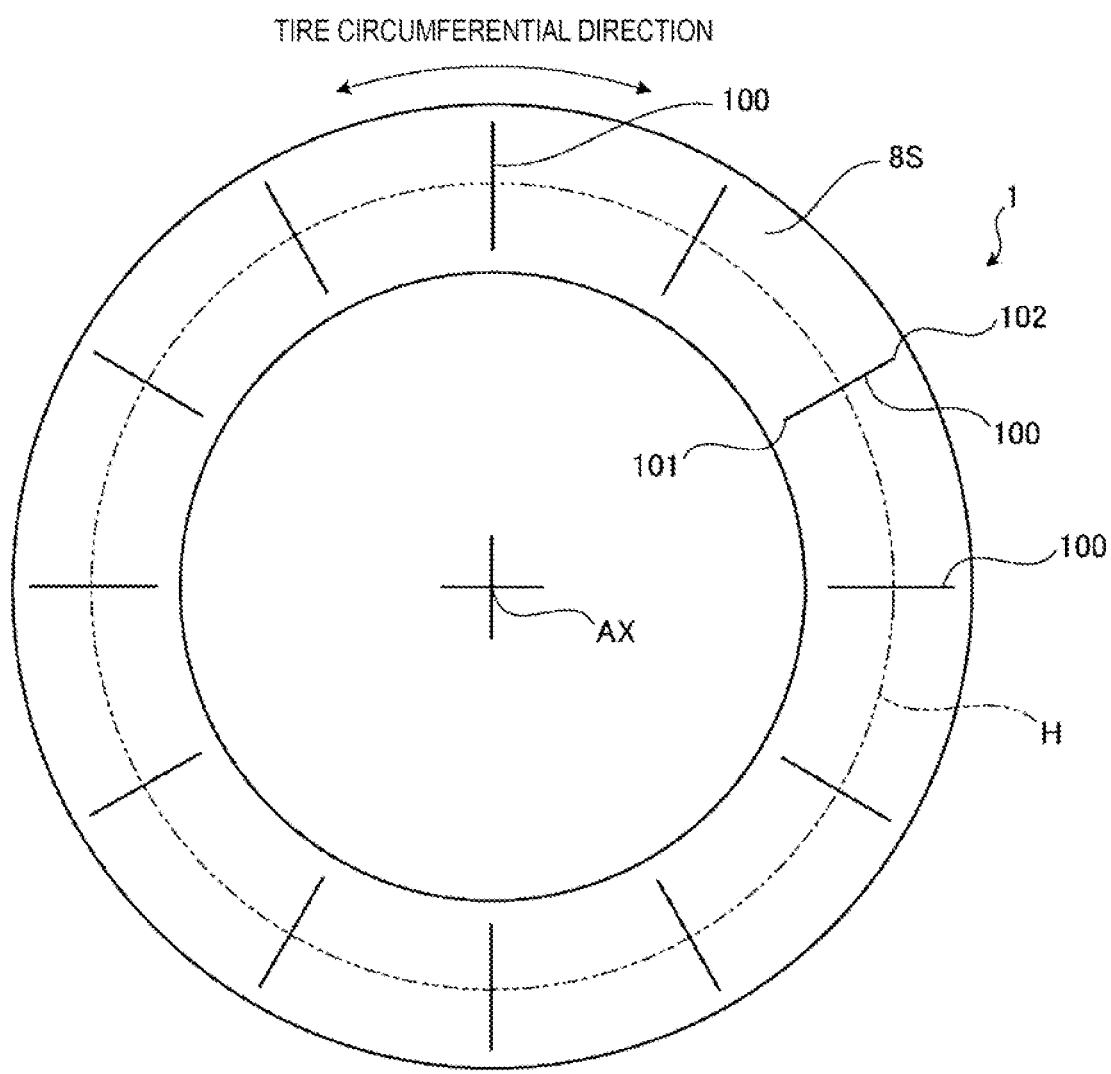
FIG. 6 is a diagram illustrating an example of a side portion of the pneumatic tire according to the first embodiment.
Figure 7:
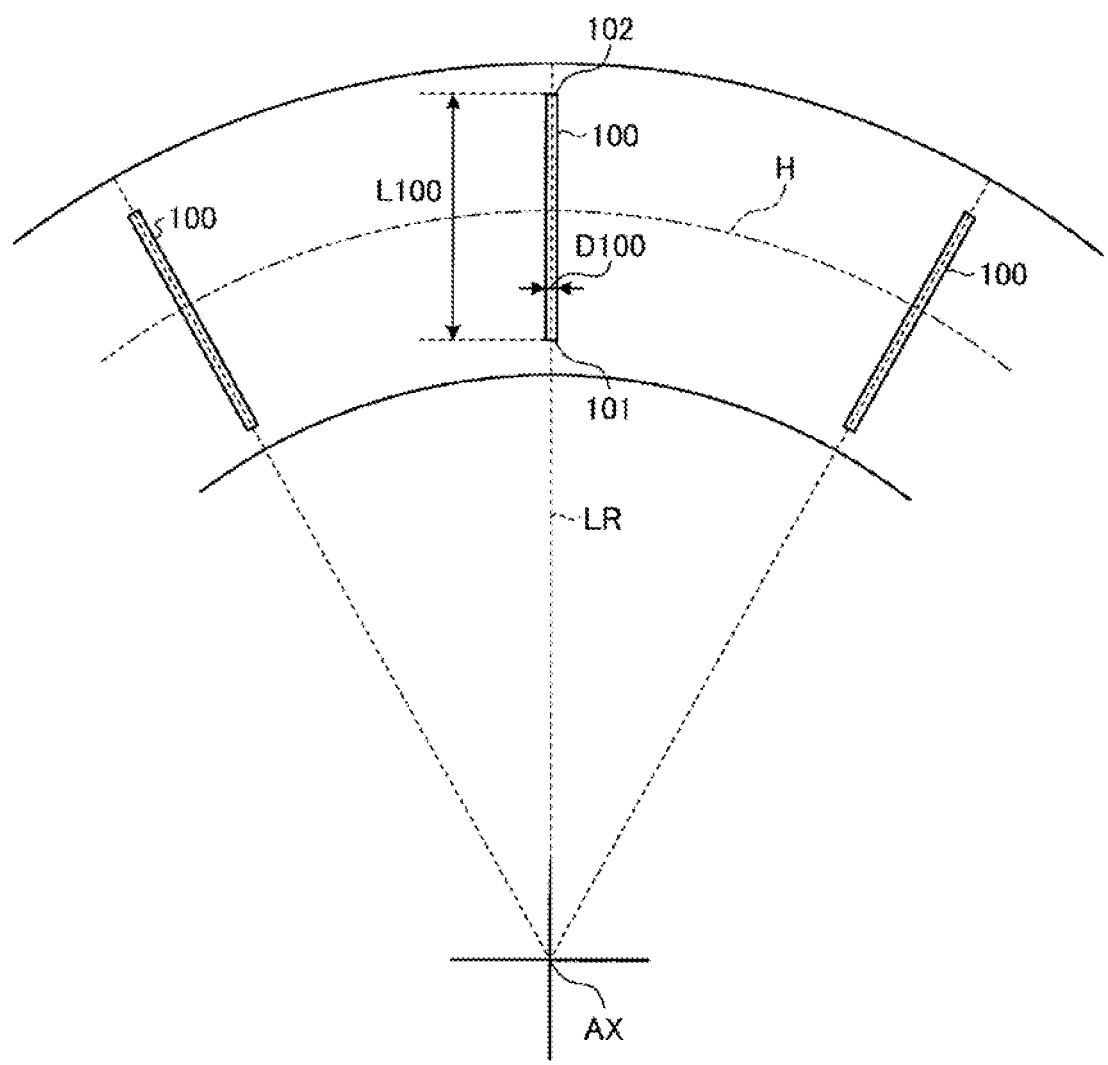
FIG. 7 is a diagram illustrating an example of the side portion of the pneumatic tire according to the first embodiment.

FIG. 6 is a schematic view illustrating the side surface 8S of the tire 1 on which the protrusion portions 100 are provided, and FIG. 7 is an enlarged view of a part of FIG. 6. As illustrated in FIG. 6 and FIG. 7, the plurality of protrusion portions 100 are provided in the tire circumferential direction. In the example illustrated in FIG. 6 and FIG. 7, 12 protrusion portions 100 are provided. The plurality of protrusion portions 100 are connected to the side surface 8S such that all of the protrusion portions 100 include the tire maximum width position H.

Each of the plurality of protrusion portions 100 includes the first end portion 101 and the second end portion 102 that is disposed further to the outer side in the tire radial direction than the first end portion 101. In a plane orthogonal to the rotation axis AX, a distance L100 between the first end portion 101 and the second end portion 102 is greater than a short-direction maximum width D100 of the protrusion portion 100. The protrusion portion 100 has a longitudinal shape that is long in the tire radial direction. The short-direction maximum width D100 of the protrusion portion 100 is 0.5 mm or greater and 5.0 mm or less.

The protrusion portion 100 is disposed such that the first end portion 101 and the second end portion 102 are aligned with a radiating line LR from the rotation axis AX. A center axis of the protrusion portion 100 is parallel with the radiated line LR.

According to the present embodiment, even when the distance G1, which indicates a side rubber gage, is made smaller in order to reduce the weight of the tire 1, the deterioration in the rigidity and cut resistance of the tire 1 is suppressed as a result of the protrusion portions 100 being provided on the side surfaces 8S of the side rubbers 8. Further, the carcass 2 of the side portions 7 is sufficiently protected by the protrusion portions 100 and the side rubbers 8.

In the present embodiment, it is suitable that the carcass folded back portion 22 do not extend as far as the tire maximum width position H, and that the carcass main body portion 21 be connected with the side rubbers 8 at the tire maximum width positions H. An increase in the amount of the carcass folded back portion 22 results in an increase in the weight of the tire 1. In the present embodiment, since the carcass folded back portion 22 does not extend as far as the tire maximum width position H, the increase in the weight of the tire 1 is suppressed.

Further, when the vehicle on which the tires 1 are mounted travels, air resistance at the tire maximum width positions H tends to become large. As a result of the longitudinal-shape protrusion portions 100 being disposed so as to include the tire maximum width position H, an air distribution promotion effect and an air streamlining effect are obtained. As a result, the air resistance is reduced, and consequently, fuel efficiency of the vehicle can be improved.

Normally, when a protrusion portion is provided at the tire maximum width position H of the tire 1, the air resistance tends to deteriorate. In the present embodiment, since the longitudinal-shape protrusion portions 100 are provided on a tire of the smallest width, and the total tire width S3 is equivalent to that of a tire (a comparative tire) on which the longitudinal-shape protrusion portions 100 are not provided, a significant deterioration in the air resistance is suppressed.

When W1/W3 is larger than 0.95, a distance between the carcass outer surface 21S and the protrusion portion outer surface 100S becomes too short. Thus, the carcass 2 is not sufficiently protected. When W1/W3 is smaller than 0.80, the distance between the carcass outer surface 21S and the protrusion portion outer surface 100S becomes too long, and the weight reduction of the tire 1 becomes difficult. When the condition (1) is satisfied, the weight reduction of the tire 1 is achieved while sufficiently protecting the carcass 2.

When G1/G2 is smaller than 0.1, the thickness of the side rubber 8 becomes too thin. Thus, the carcass 2 is not sufficiently protected. When G1/G2 is larger than 1, the thickness of the side rubber 8 becomes larger than the height of the protrusion portion 100, and the weight reduction of the tire 1 becomes difficult. When the conditions (1) and (2) are satisfied, the weight reduction of the tire 1 is achieved while suppressing the deterioration in the rigidity and the cut resistance of the tire 1.

Further, as a result of the plurality of protrusion portions 100 being connected to the side surfaces 8S such that all of the protrusion portions 100 include the tire maximum width position H, bending of the side portions 7 is sufficiently suppressed at the tire maximum width position H, and the side rubbers 8 and the carcass 2 are sufficiently protected. Further, the air resistance is reduced, and consequently, the fuel efficiency of the vehicle is improved.

Further, as a result of the protrusion portions 100 being provided on the side portions 7 on both the sides, the carcass 2 of the two side portions 7 on both the sides can be sufficiently protected, while achieving the weight reduction through making the side rubbers 8 thinner.

Further, as a result of the protrusion portions 100 being provided in the range of from 0.1×SH to 0.4×SH in the tire radial direction, the functions of the protrusion portions 100 are fully used while achieving the weight reduction of the tire 1. When the protrusion portions 100 are provided in a range larger than 0.4×SH, although the weight of the tire 1 increases, a significant improvement in the functions of the protrusion portions 100, namely, in a rigidity reduction suppression function, a cut resistance reduction suppression function, and a carcass protection function, cannot be expected. When the protrusion portions 100 are provided in a range smaller than 0.1×SH, the carcass protection function is not sufficiently used. As a result of the protrusion portions 100 being provided in the range of from 0.1×SH to 0.4×SH, both the weight reduction of the tire 1 and the use of the functions of the protrusion portions 100 are achieved.

Further, since the short-direction maximum width D100 of the protrusion portion 100 is 0.5 mm or greater and 5.0 mm or less, the air resistance and the fuel efficiency of the vehicle is improved while suppressing the increase in the weight of the tire 1. When the short-direction maximum width D100 of the protrusion portion 100 is less than 0.5 mm, the protrusion portion 100 becomes prone to deformation, and the air distribution promotion effect and the air streamlining effect are difficult to achieve. When the short-direction maximum width D100 of the protrusion portion 100 is greater than 5.0 mm, the protrusion portion 100 itself becomes a source of the air resistance, and the air distribution promotion effect and the air streamlining effect cannot be sufficiently obtained. Further, when the protrusion portion 100 is too thick, the weight of the tire 1 increases. As a result of setting the short-direction maximum width D100 of the protrusion portion 100 to be 0.5 mm or greater and 5.0 mm or less, the air resistance and the fuel efficiency of the vehicle is improved while suppressing the increase in the weight of the tire 1.

Modified Examples

In the tire 1 provided with the protrusion portions 100, the distance W1, the distance W2, and the distance W3 may be set so as to satisfy the following conditions:

$$0.80 \leq W1/W3 \leq 0.95; \text{ and} \quad (3)$$

$$1.0 \text{ mm} \leq G1 \leq 2.5 \text{ mm}. \quad (4)$$

When the condition (3) is satisfied, the weight reduction of the tire 1 is achieved while suppressing the deterioration in the rigidity and the cut resistance of the tire 1.

Further, when the condition (4) is satisfied, the weight reduction of the tire 1 is achieved while sufficiently protecting the carcass 2. A side rubber gage of a conventional tire is thicker than 2.5 mm. As a result of causing the distance G1 to be 2.5 mm or less through making it smaller than a conventional side rubber gage, the weight reduction of the tire 1 is achieved. When the distance G1 is smaller than 1.0 mm, the thickness of the side rubber 8 becomes too thin, and the carcass 2 is not sufficiently protected. As a result of the conditions (3) and (4) being satisfied, the weight reduction of the tire 1 is achieved while sufficiently protecting the carcass 2.

Second Embodiment

Figure 8:
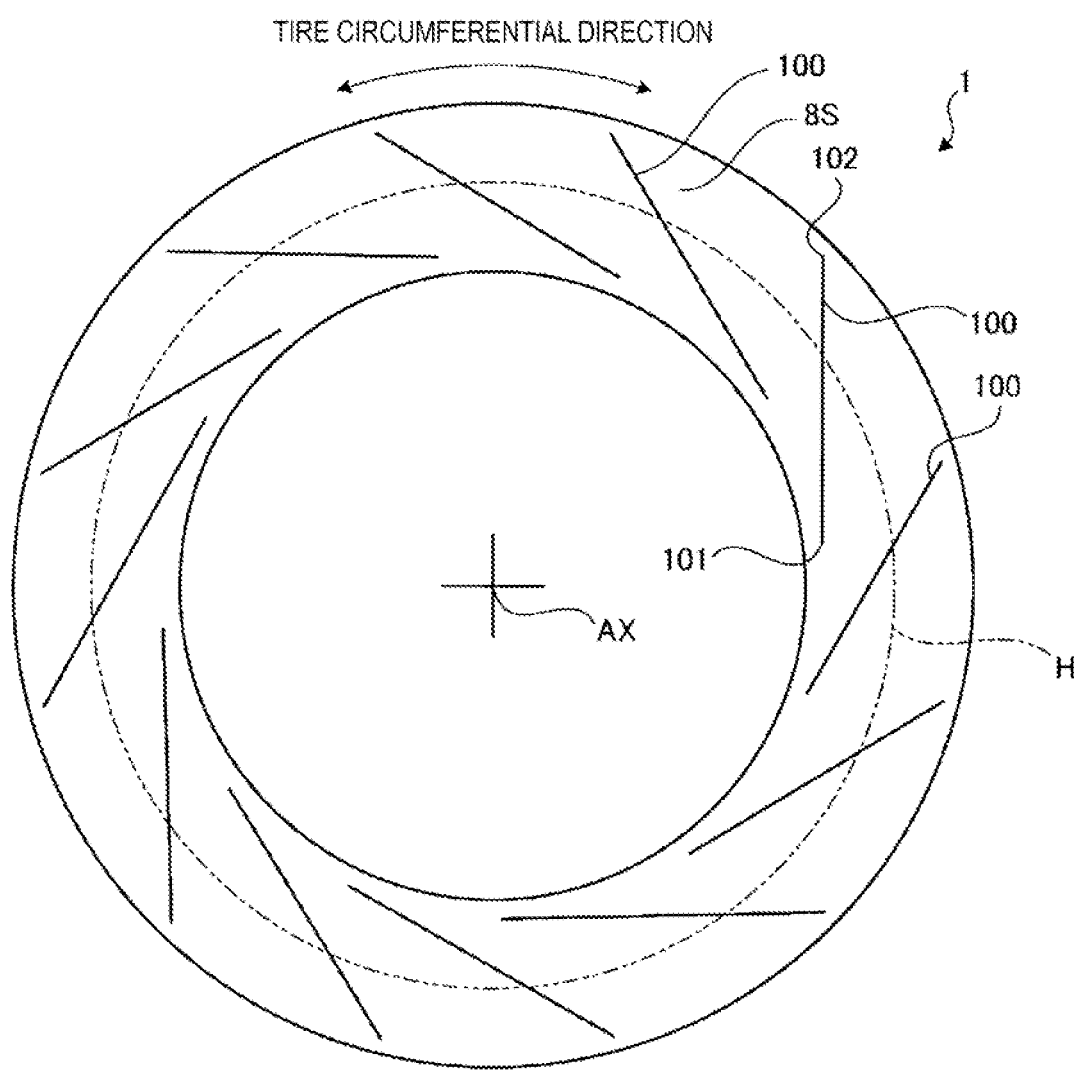
FIG. 8 is a diagram illustrating an example of a side portion of a pneumatic tire according to a second embodiment.
Figure 9:
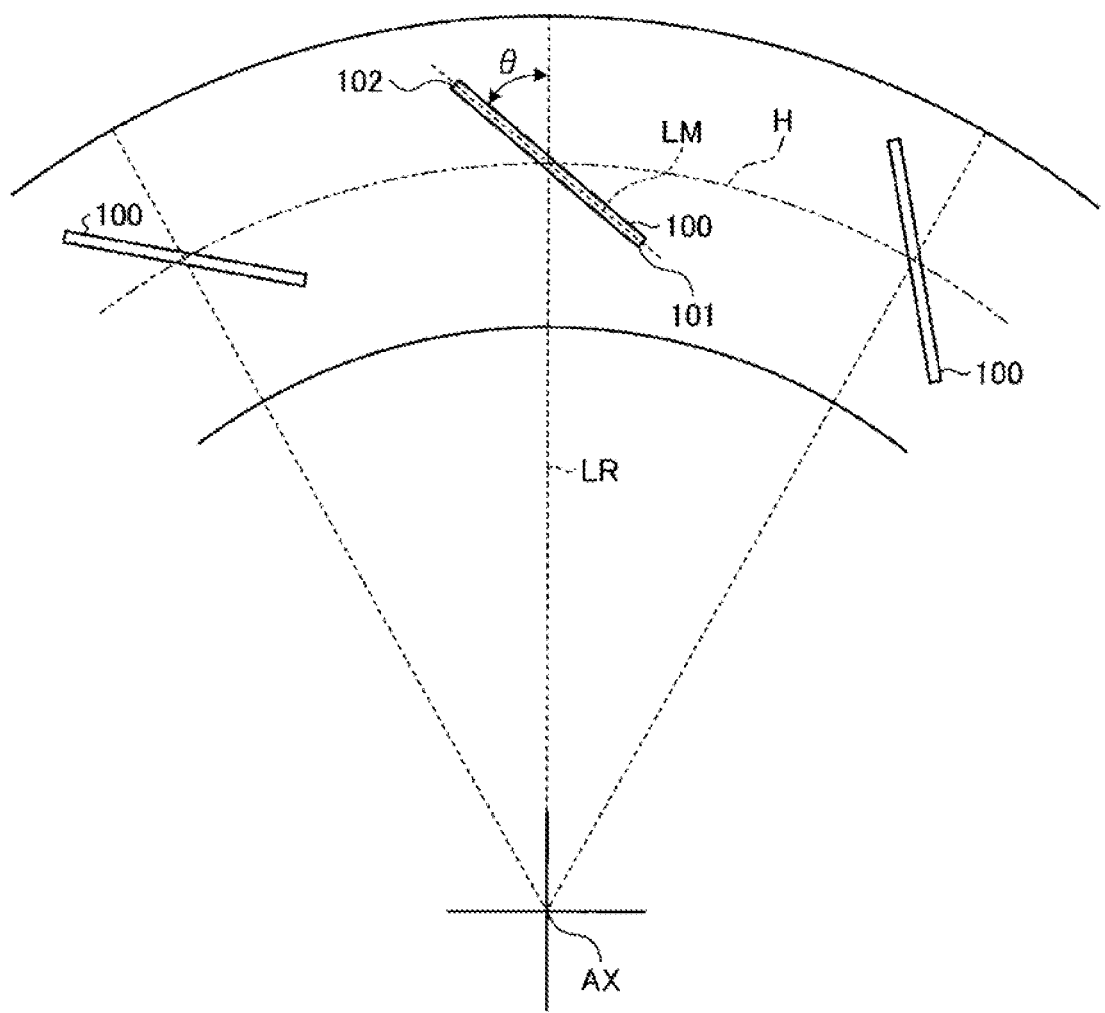
FIG. 9 is a diagram illustrating an example of the side portion of the pneumatic tire according to the second embodiment.

FIG. 8 is a diagram schematically illustrating the side surface 8S provided with the protrusion portions 100 according to the present embodiment. FIG. 9 is an enlarged view of a part of FIG. 8. As illustrated in FIG. 8 and FIG. 9, the protrusion portions 100 are inclined with respect to the radiating line LR from the rotation axis AX such that the first end portion 101 and the second end portion 102 have different positions from each other in the tire circumferential direction. In the example illustrated in FIG. 8 and FIG. 9, 12 protrusion portions 100 are provided.

Further, for each of the plurality of protrusion portions 100, directions in which the second end portions 102 are shifted with respect to the first end portions 101 are the same. Specifically, the inclination directions of the plurality of protrusion portions 100 are the same.

As a result of the longitudinal-shape protrusion portions 100 being disposed in the inclined manner, the carcass 2 is sufficiently protected, and at the same time, imbalances in the rigidity of the side portions 7 in the tire circumferential direction are suppressed. Since the imbalances in the rigidity in the tire circumferential direction are suppressed, when the tire 1 travels on the road surface, deformation states of the side portions 7 become consistent, and uniformity is thus improved. Further, as a result of the longitudinal-shape protrusion portions 100 being disposed in the inclined manner, an excessive increase of the rigidity of the side portions 7 in the tire radial direction is suppressed. Thus, when the tire 1 travels on the road surface, the side portions 7 is capable of deforming appropriately in the tire radial direction.

Further, making the inclination directions of the plurality of protrusion portions 100 identical to each other further suppresses the imbalances in the rigidity of the side portions 7 in the tire circumferential direction. Thus, uniformity is effectively improved.

Figure 10:
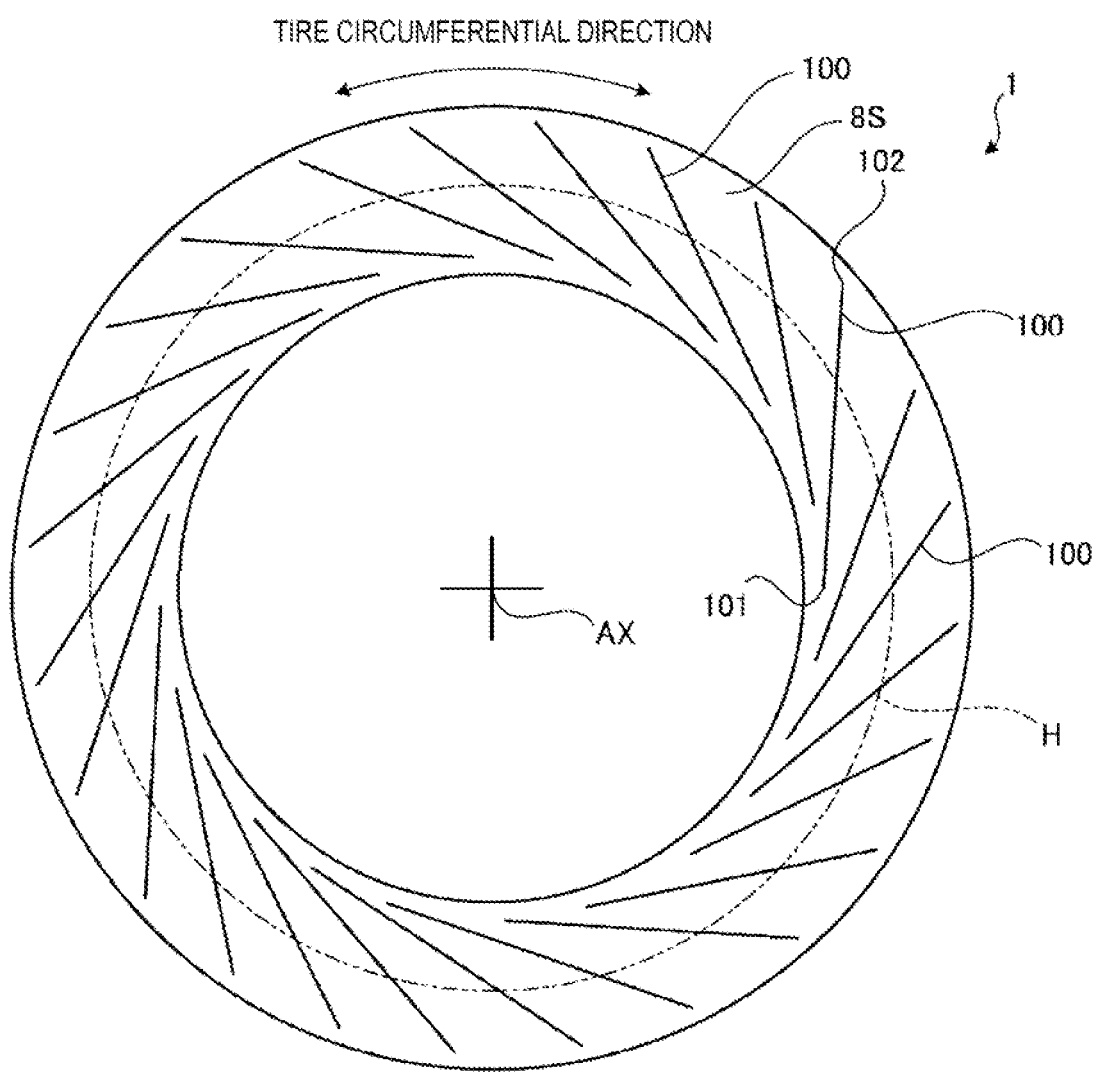
FIG. 10 is a diagram illustrating an example of the side portion of the pneumatic tire according to the second embodiment.
Figure 11:
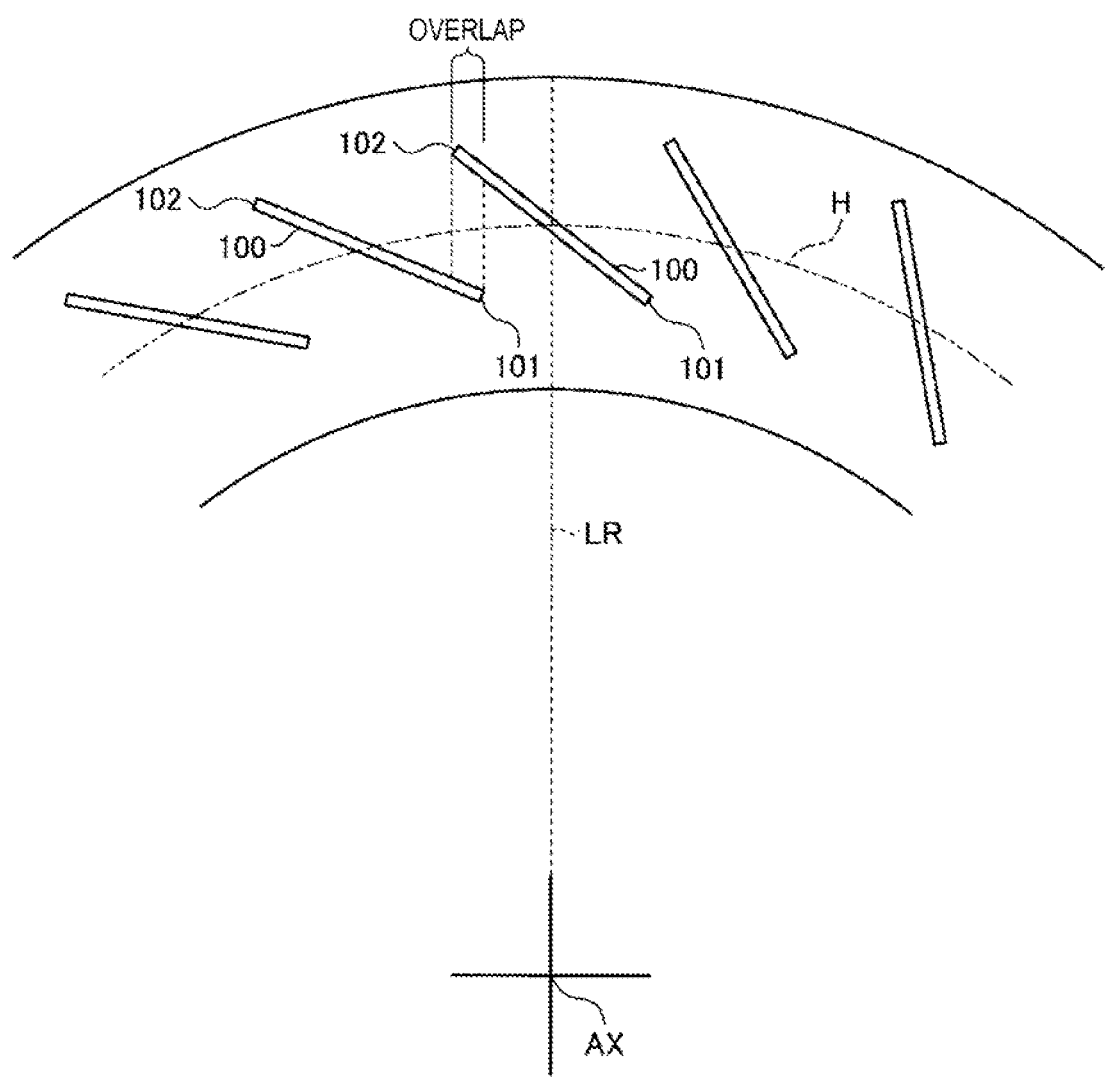
FIG. 11 is a diagram illustrating an example of the side portion of the pneumatic tire according to the second embodiment.

FIG. 10 illustrates another arrangement example of the protrusion portions 100. FIG. 11 is an enlarged view of a part of FIG. 10. In the example illustrated in FIG. 10 and FIG. 11, 24 protrusion portions 100 are provided. Further, of the plurality of protrusion portions 100, a given protrusion portion 100 overlaps, in the tire circumferential direction, with at least part of the protrusion portion 100 disposed adjacent to the given protrusion portion 100.

As a result of the adjacent protrusion portions 100 being disposed so as to overlap with each other, the carcass 2 is sufficiently protected, and the rigidity of the side portions 7 in the tire radial direction is appropriately adjusted.

Figure 12:
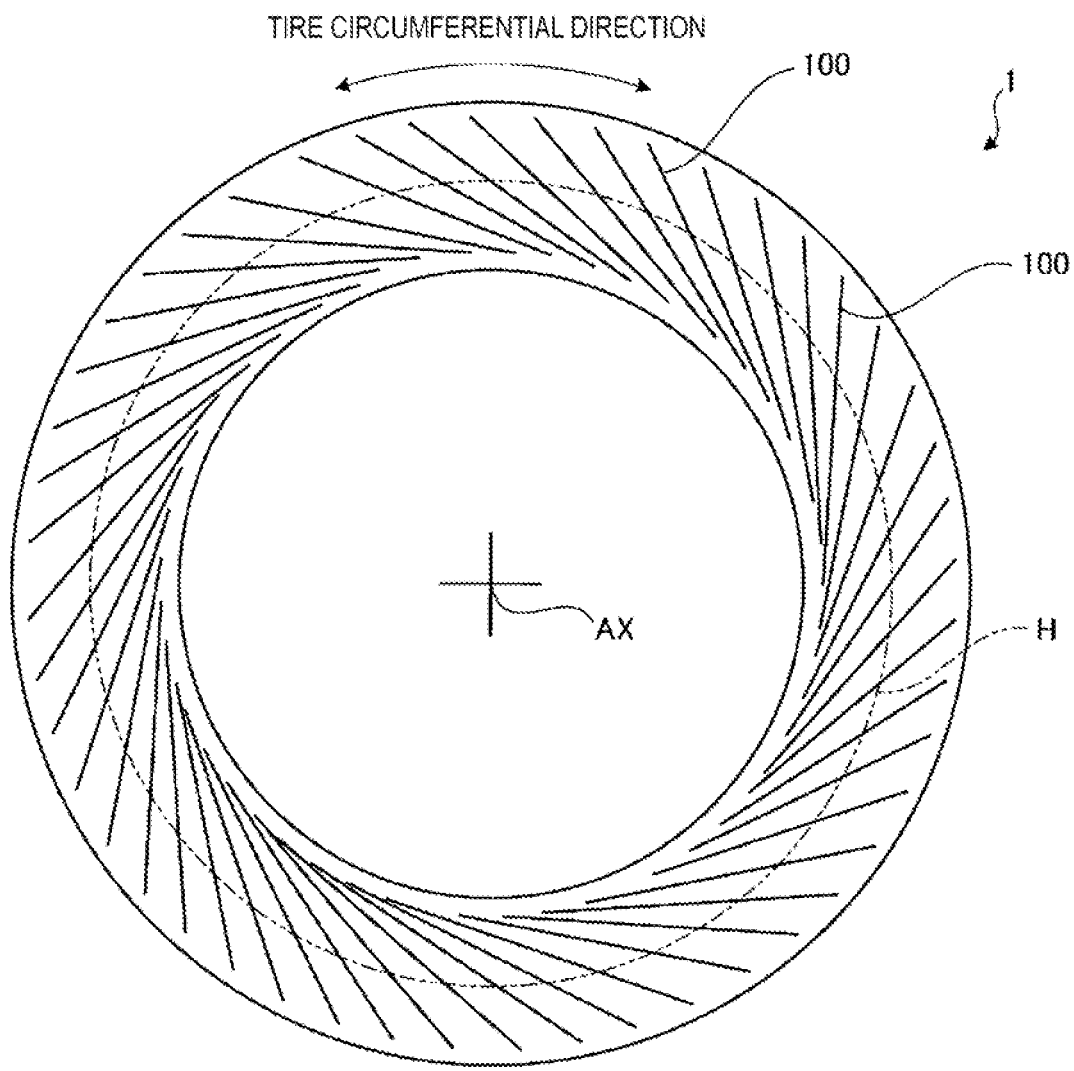
FIG. 12 is a diagram illustrating an example of the side portion of the pneumatic tire according to the second embodiment.

FIG. 12 illustrates another arrangement example of the protrusion portions 100. In the example illustrated in FIG. 12, 48 protrusion portions 100 are provided. In the example illustrated in FIG. 12, the adjacent protrusion portions 100 overlap with each other.

In this way, the number of protrusion portions 100 can be set as desired. The number of protrusion portions 100 disposed on the side surface 8S in the tire circumferential direction is suitably set to be in a range of from 10 to 50. When the number of protrusion portions 100 is less than 10, the air distribution promotion effect and the air streamlining effect cannot be sufficiently obtained. When the number of protrusion portions 100 is more than 50, the protrusion portions 100 themselves become the source of the air resistance, and the air distribution promotion effect and the air streamlining effect cannot be sufficiently obtained. Further, when the number of protrusion portions 100 is too large, the weight of the tire 1 increases. As a result of setting the number of protrusion portions 100 to be 10 or more and 50 or less, the air resistance and the fuel efficiency of the vehicle can be improved while suppressing the increase in the weight of the tire 1.

Figure 13:
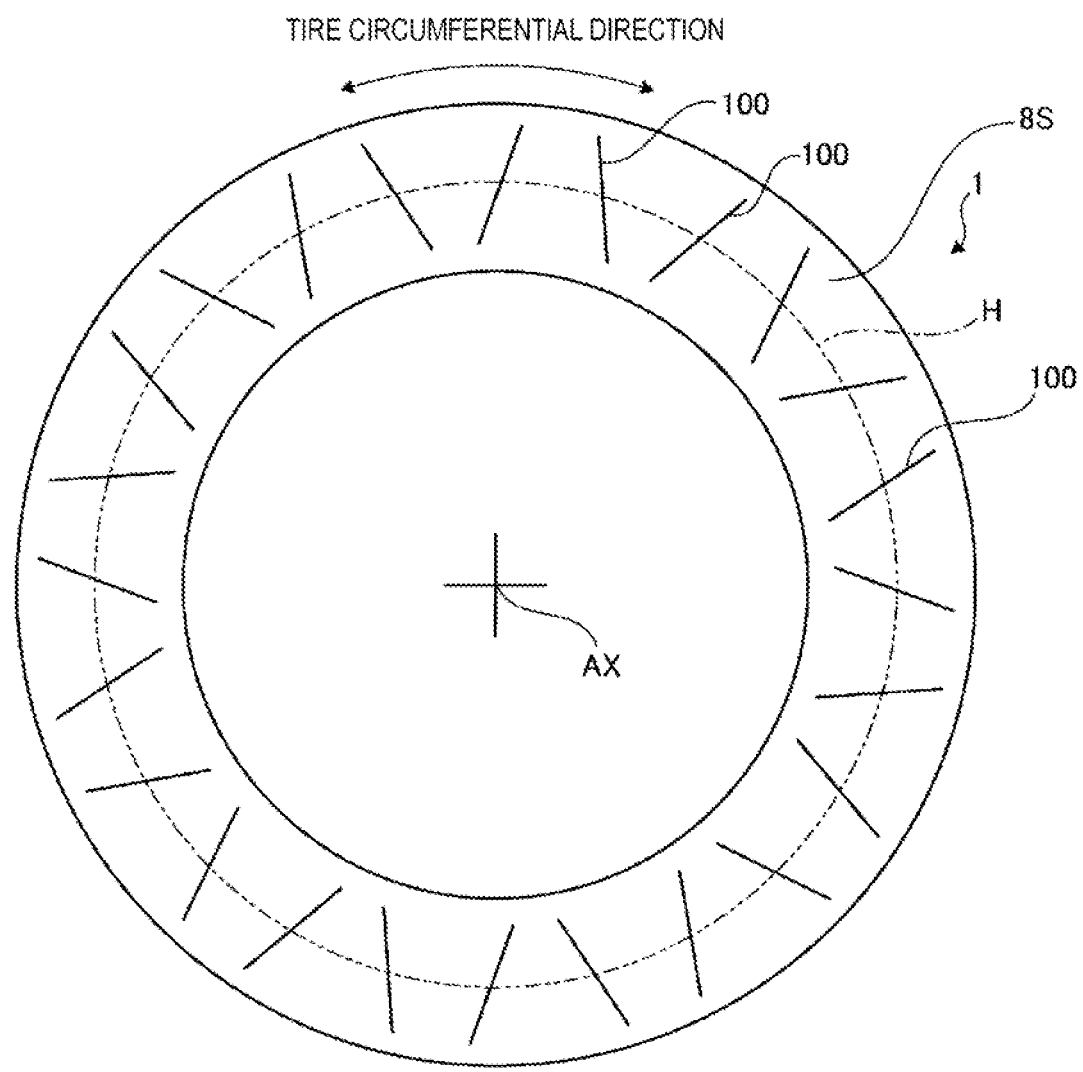
FIG. 13 is a diagram illustrating an example of the side portion of the pneumatic tire according to the second embodiment.

FIG. 13 illustrates another arrangement example of the protrusion portions 100. As illustrated in FIG. 13, the inclination directions of some of the protrusion portions 100 may be different from the inclination directions of the other protrusion portions 100.

Figure 14:
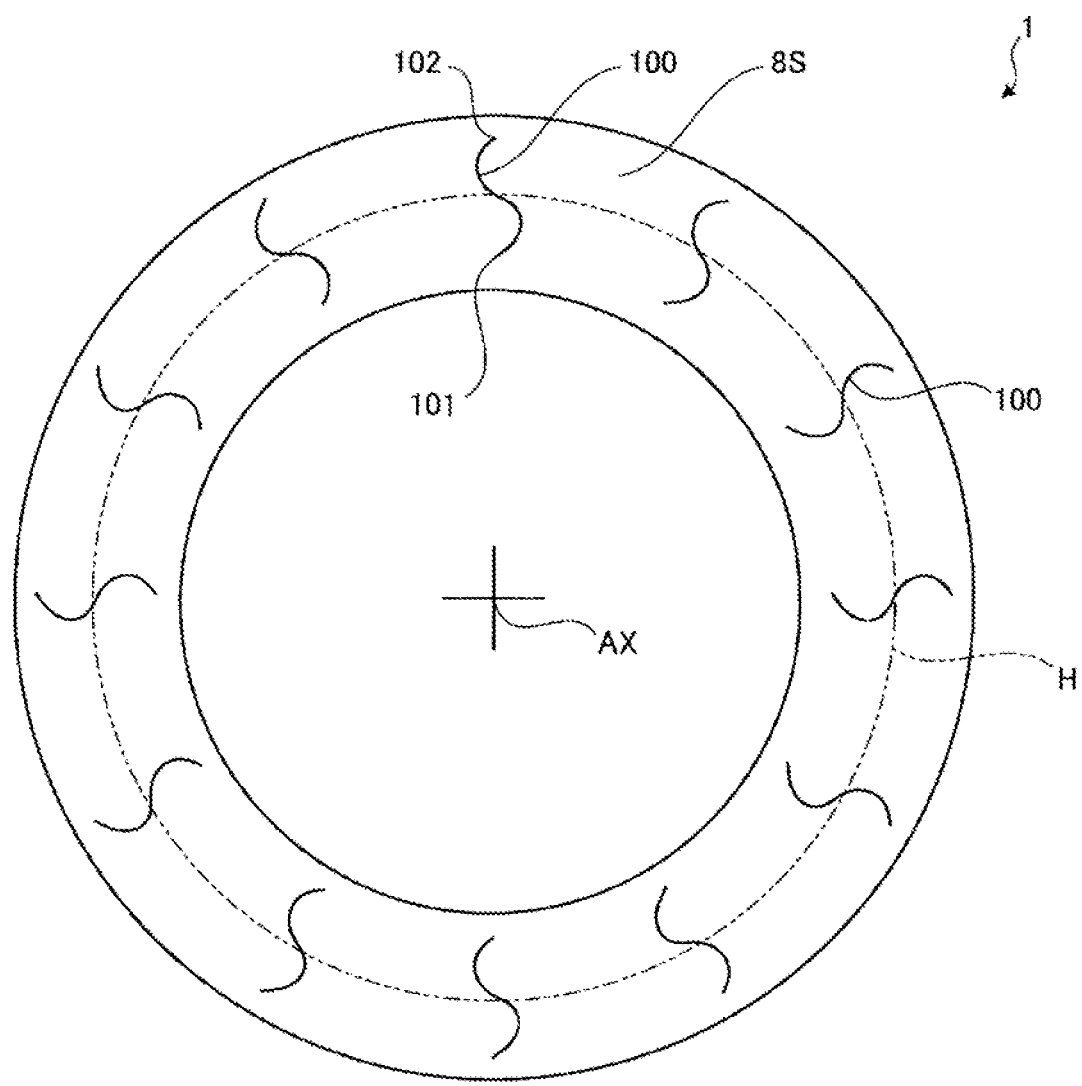
FIG. 14 is a diagram illustrating an example of the side portion of the pneumatic tire according to the second embodiment.

FIG. 14 illustrates another arrangement example of the protrusion portions 100. In the above-described examples, the protrusion portion 100 has a linear shape in a plane orthogonal to the rotation axis AX. As illustrated in FIG. 14, the protrusion portion 100 may have a curved portion in the plane orthogonal to the rotation axis AX. Further, a plurality of the curved portions may be provided in a single protrusion portion 100. In the example illustrated in FIG. 14, 12 protrusion portions 100 are provided in the tire circumferential direction.

Figure 15:
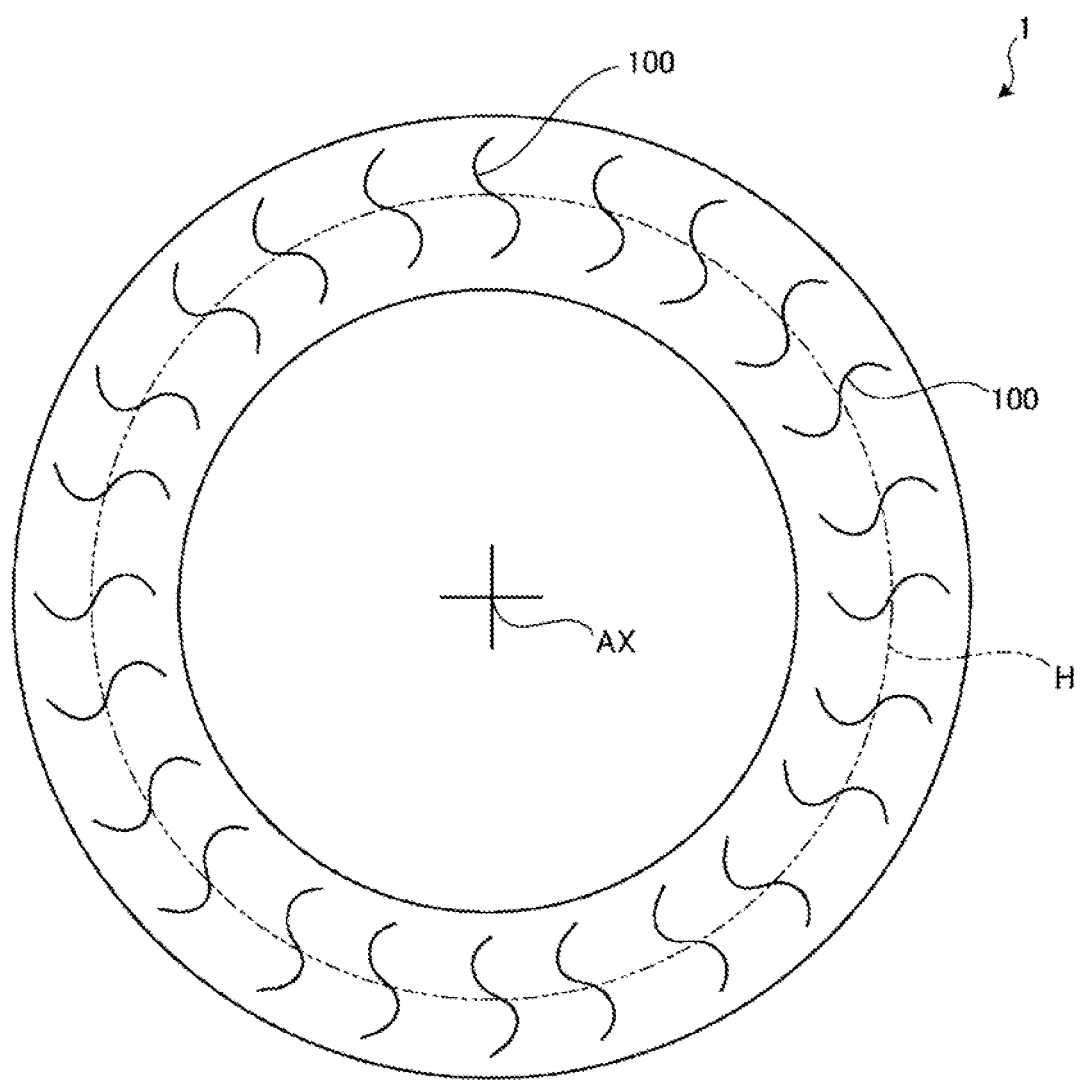
FIG. 15 is a diagram illustrating an example of the side portion of the pneumatic tire according to the second embodiment.
Figure 16:
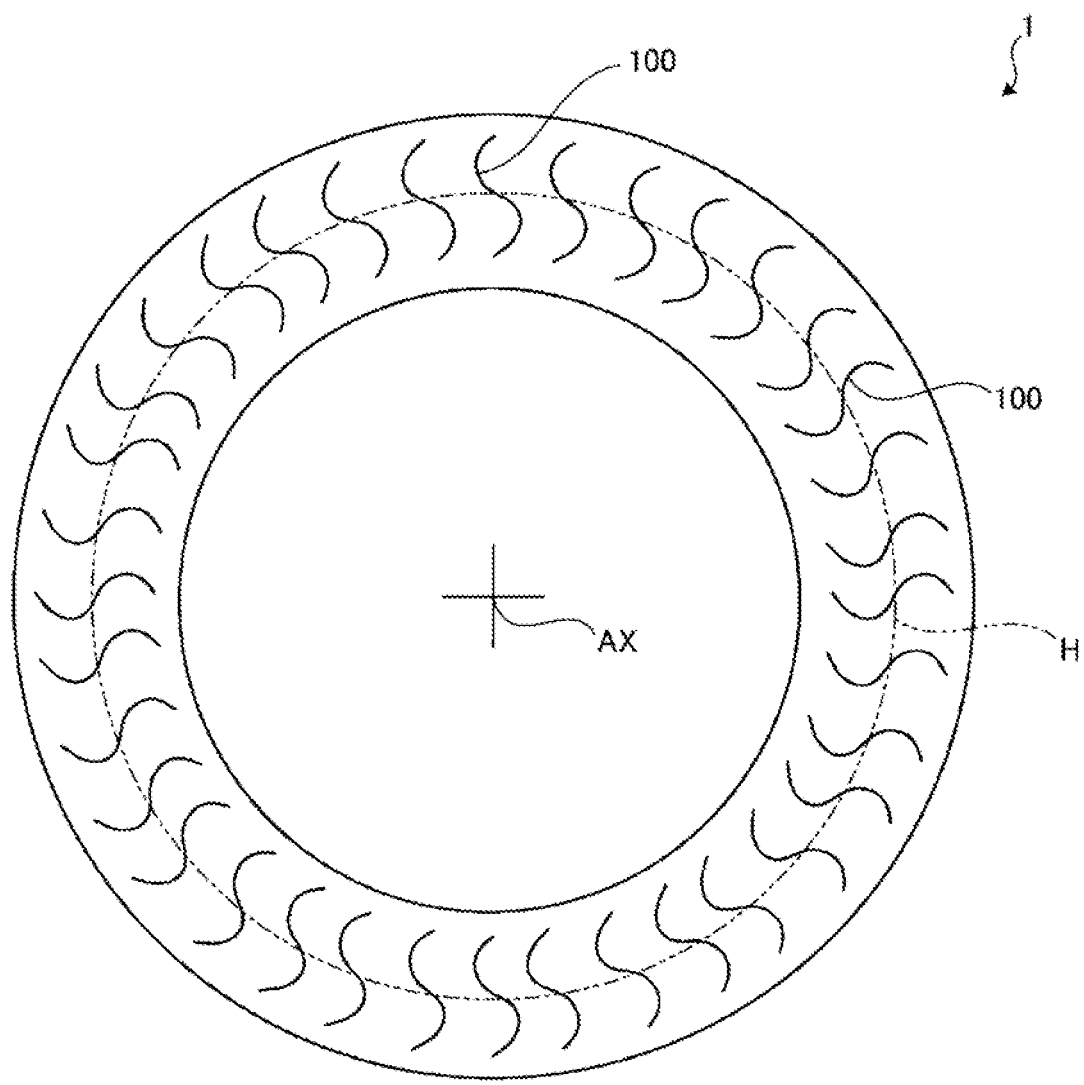
FIG. 16 is a diagram illustrating an example of the side portion of the pneumatic tire according to the second embodiment.

FIG. 15 and FIG. 16 each illustrate another arrangement example of the protrusion portions 100. As illustrated in FIG. 15, 24 protrusion portions 100, each of which has the curved portions, may be provided in the tire circumferential direction, and as illustrated in FIG. 16, 36 protrusion portions 100 may be provided.

Figure 17:
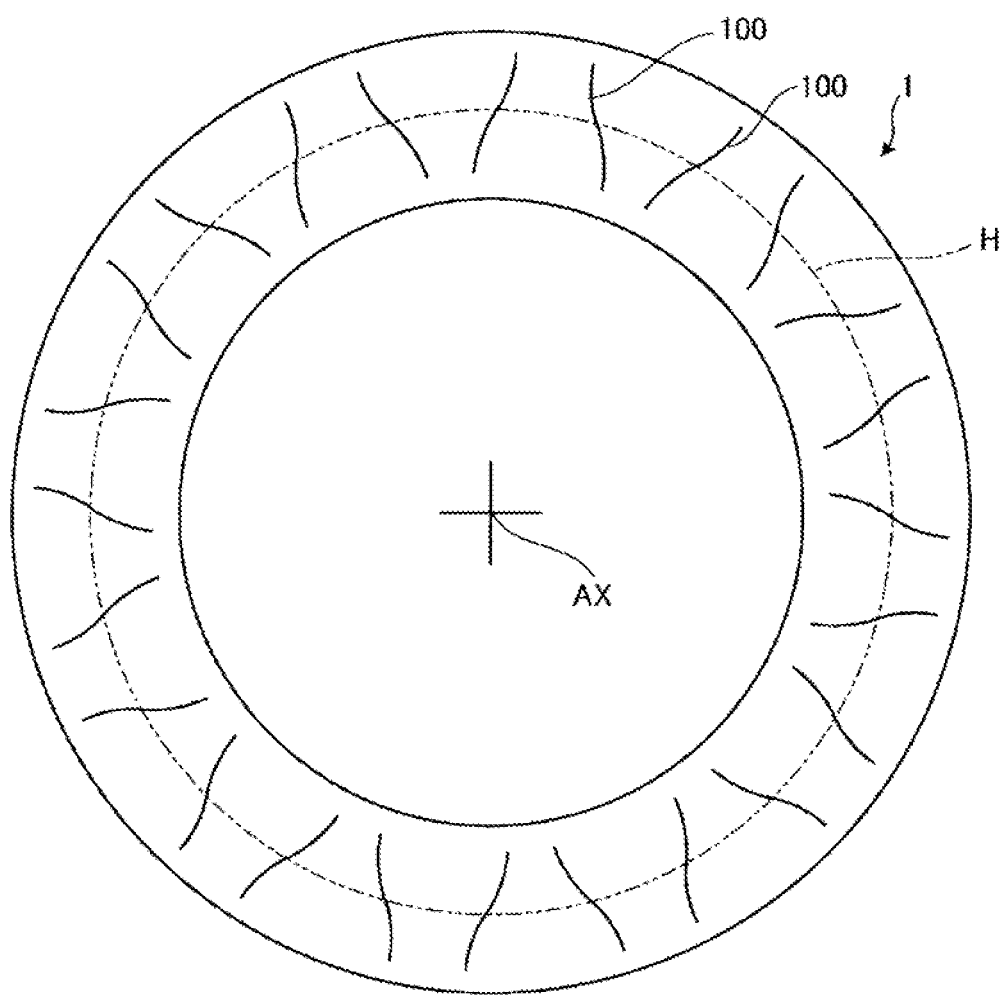
FIG. 17 is a diagram illustrating an example of the side portion of the pneumatic tire according to the second embodiment.
Figure 18:
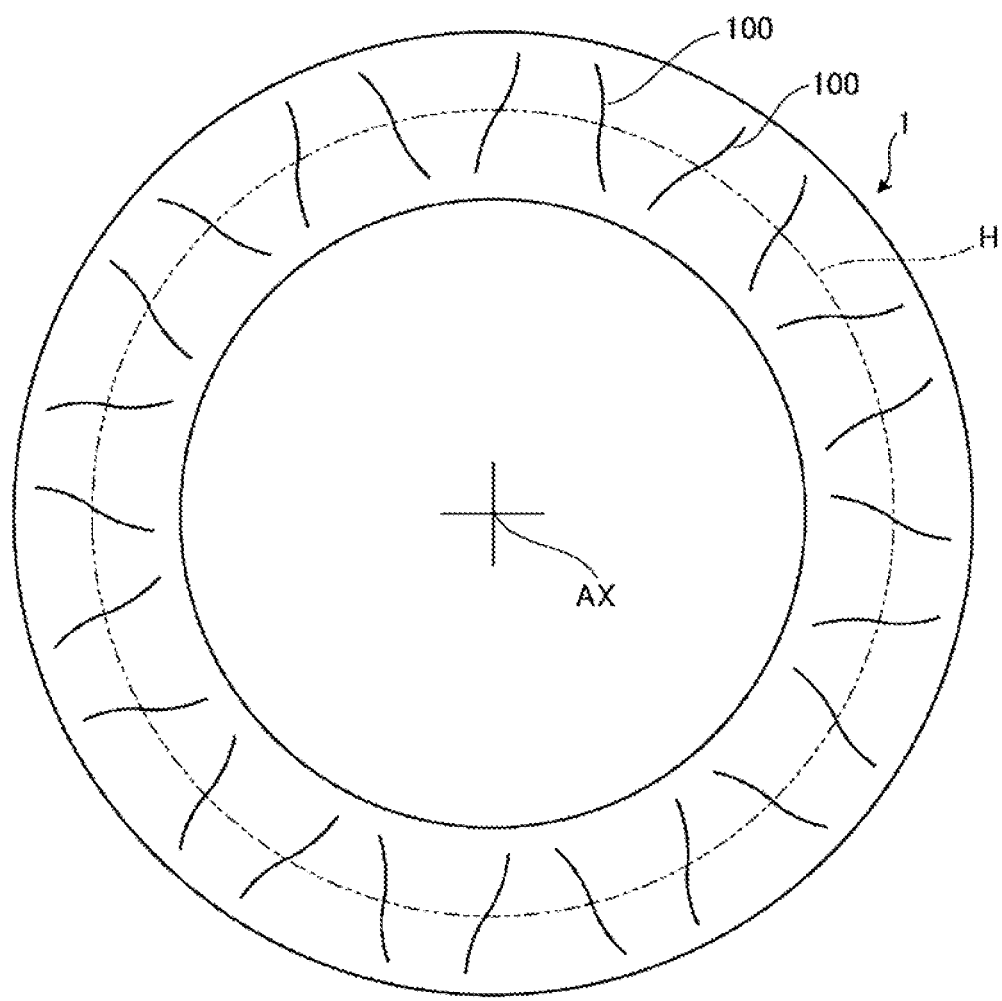
FIG. 18 is a diagram illustrating an example of the side portion of the pneumatic tire according to the second embodiment.

FIG. 17 and FIG. 18 each illustrate another arrangement example of the protrusion portions 100. As illustrated in FIG. 17, of the plurality of protrusion portions 100, each of which has the same shape, some of the protrusion portions 100 may have a different orientation in the tire circumferential direction from that of others of the protrusion portions 100. Also, as illustrated in FIG. 18, the plurality of protrusion portions 100, each of which has the same shape, may have the same orientation in the tire circumferential direction, and may be disposed so as to have different angles with respect to the radiating line LR.

Third Embodiment

Figure 19:
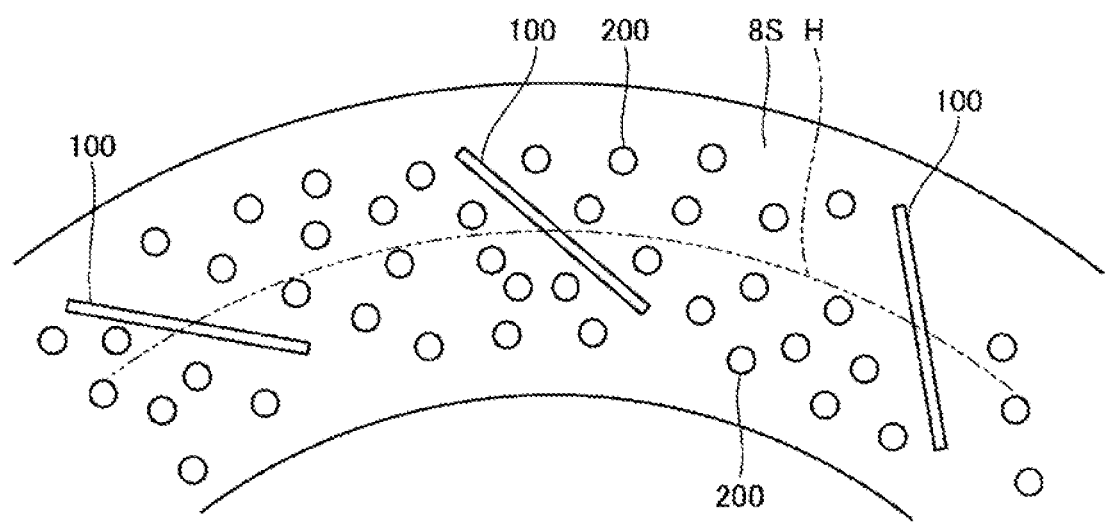
FIG. 19 is a diagram illustrating an example of a side portion of a pneumatic tire according to a third embodiment.

FIG. 19 is a diagram schematically illustrating the side surface 8S provided with the protrusion portions 100 according to a present embodiment. As illustrated in FIG. 19, the tire 1 is provided with the plurality of protrusion portions 100 that are disposed in the tire circumferential direction and a plurality of recessed portions 200 that are provided in the side surface 8S between the adjacent protrusion portions 100.

The side surface 8S is dimpled. The recessed portion 200 is formed in a circular shape, and the depth dimension of the recessed portion 200 is smaller than the height dimension of the protrusion portion 100.

As a result of the recessed portions 200, which are formed as dimples, being provided in the side surface 8S, the air resistance of the vehicle is further suppressed, and the fuel efficiency is thus be improved. As a result of the recessed portions 200 being provided in addition to the protrusion portions 100, the air flowing from the front side to the rear side of the vehicle becomes turbulent. As a result, a turbulent flow boundary layer is generated in the periphery of the tire 1, and an expansion of the air is suppressed. As a result of the expansion of the air passing the vehicle being suppressed, the air resistance of the vehicle is reduced, and the fuel efficiency of the vehicle is thus improved.

Fourth Embodiment

Figure 20:
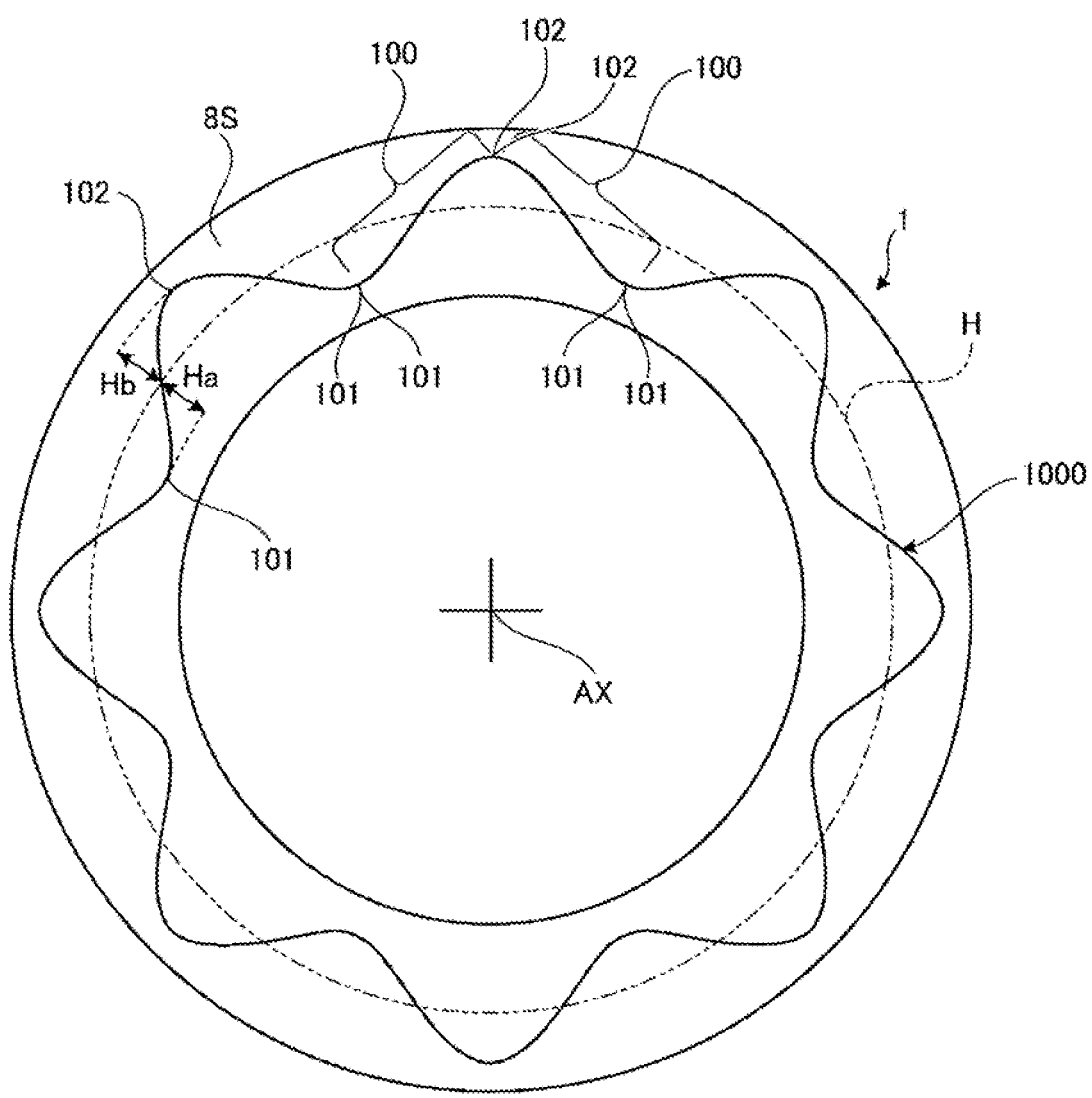
FIG. 20 is a diagram illustrating an example of a side portion of a pneumatic tire according to a fourth embodiment.

FIG. 20 is a diagram illustrating an example of the tire 1 according to the present embodiment. As illustrated in FIG. 20, the plurality of protrusion portions 100, each of which has the curved portion, may be provided in the tire circumferential direction, the first end portions 101 of the adjacent protrusion portions 100 may be connected with each other, and the second end portions 102 of the adjacent protrusion portions 100 may also be connected with each other. Specifically, an integrally formed annular protrusion portion 1000, which includes a plurality of the curved portions, may be provided on the side surface 8S. The plurality of protrusion portions 100 have the same shape. The adjacent protrusion portions 100 are disposed so as to have different orientations from each other in the tire circumferential direction.

In the example illustrated in FIG. 20, a distance Ha between the tire maximum width position H and the first end portion 101 is equal to a distance Hb between the tire maximum width position H and the second end portion 102. Note that the distance Ha may be larger or smaller than the distance Hb.

In this way, the annular protrusion portion 1000, which is formed by integrating the plurality of protrusion portions 100, may be provided. Also in the present embodiment, the rigidity and the cut resistance are improved by the annular protrusion portion 1000.

Note that, in the above-described embodiments, the plurality of protrusion portions 100 are disposed such that all of the protrusion portions 100 include the tire maximum width position H. However, some of the protrusion portions 100 may be disposed so as to include the tire maximum width position H, and the other protrusion portions 100 may be disposed so as not to include the tire maximum width position H.

The configuration illustrated in each of the above-described embodiments represents an example of the present technology. The configuration may be combined with another known technology, or part of the configuration may be omitted or changed without departing from the scope of the present technology.

Examples

Evaluation tests on the tire 1 according to the present technology were performed. Contents and results of the evaluation tests will be described below.

Evaluation Test 1

Evaluation tests relating to the above-described conditions (1) and (2) will now be described. In the evaluation tests, an evaluation was carried out in order to check the "cut resistance" and the "tire weight reduction ratio" for a case in which the condition (1) and the condition (2) are satisfied and a case in which neither the condition (1) nor the condition (2) is satisfied.

The evaluation of the "cut resistance" and the "tire weight reduction ratio" was carried out for cases in which "W1/W3" is "0.79", "0.80", "0.81", "0.85", "0.90", "0.94", "0.95", and "0.96", when "G1/G2" is "0.09", "0.10", "0.11", "0.50", "0.99", "1.00", and "1.01".

For the tires 1, the ranges in which the protrusion portions 100 were provided in the tire radial direction were the same, the numbers of the protrusion portions 100 disposed in the tire circumferential direction were the same, and the short-direction maximum widths of the protrusion portions 100 were the same. The range in which the protrusion portions 100 were provided in the tire radial direction was set to "0.3×SH", the number of the protrusion portions 100 disposed in the tire circumferential direction was set to "30", and the short-direction maximum width of the protrusion portions 100 was set to "3.00 mm".

In the evaluation test of the "cut resistance", the tires 1, which satisfy each of the above-described conditions, were mounted on the regular rims, inflated to the regular internal pressure, and mounted on a test vehicle. Thereafter, the test vehicle traveled at a speed of 20 km/h and run over a curb having a height of 110 mm, at an approach angle of 30 degrees. Then, cracks (length and depth of the cracks) generated in the side portions 7 of the tires 1 were observed. Then, on the basis of the observation results, the tire 1 in which the cracks were generated was determined as "Fail", and the tire 1 in which the cracks were not generated was determined as "Pass". When the evaluation result is "Pass", the result indicates that the cut resistance is excellent.

In the evaluation test of the "tire weight reduction ratio", the weight reduction ratios of the tires 1 having the above-described conditions were evaluated in relation to a conventional tire on which the protrusion portions 100 were not provided. The total tire width S3 of the tire 1 having each of the above-described conditions was the same as the total tire width of the conventional tire. The tires 1 whose tire weight reduction ratio with respect to the conventional tire does not satisfy a specified value were determined as "Fail", and the tires 1 whose tire weight reduction ratio with respect to the conventional tire satisfies the specified value were determined as "Pass". When the evaluation result is "Pass", the result indicates that the tire weight reduction ratio is excellent.

Results of the evaluation tests are shown in FIG. 21 to FIG. 27. FIG. 21 shows the results of the "cut resistance" and the "tire weight reduction ratio" obtained when "W1/W3" was changed while "G1/G2" was set to 0.09. FIG. 22 shows the results of the "cut resistance" and the "tire weight reduction ratio" obtained when "W1/W3" was changed while "G1/G2" was set to 0.10. FIG. 23 shows the results of the "cut resistance" and the "tire weight reduction ratio" obtained when "W1/W3" was changed while "G1/G2" was set to 0.11. FIG. 24 shows the results of the "cut resistance" and the "tire weight reduction ratio" obtained when "W1/W3" was changed while "G1/G2" was set to 0.50. FIG. 25 shows the results of the "cut resistance" and the "tire weight reduction ratio" obtained when "W1/W3" was changed while "G1/G2" was set to 0.99. FIG. 26 shows the results of the "cut resistance" and the "tire weight reduction ratio" obtained when "W1/W3" was changed while "G1/G2" was set to 1.00. FIG. 27 shows the results of the "cut resistance" and the "tire weight reduction ratio" obtained when "W1/W3" was changed while "G1/G2" was set to 1.01.

As illustrated in FIG. 21 to FIG. 27, it can be confirmed that both the "cut resistance" and the "tire weight reduction ratio" are poor when the condition (2) is not satisfied.

As illustrated in FIG. 22 to FIG. 26, it can be confirmed that both the "cut resistance" and the "tire weight reduction ratio" are excellent when the condition (1) is also satisfied in a state in which the condition (2) is satisfied.

Evaluation Test 2

Evaluation tests relating to the above-described conditions (3) and (4) will now be described. In the evaluation tests, evaluation was carried out in order to check the "cut resistance" and the "tire weight reduction ratio" for a case in which the condition (3) and the condition (4) are satisfied and a case in which neither the condition (3) nor the condition (4) is satisfied.

The evaluation of the "cut resistance" and the "tire weight reduction ratio" was carried out for cases in which "W1/W3" was changed to "0.79", "0.80", "0.81", "0.85", "0.90", "0.94", "0.95", and "0.96", while "G1" was set to "0.99 mm", "1.00 mm", "1.01 mm", "2.00 mm", "2.49 mm", "2.50 mm", and "2.51 mm".

The content and procedure of the evaluation tests of the "cut resistance" and the "tire weight reduction ratio" were the same as the content and procedure of the Evaluation Test 1.

Results of the evaluation tests are shown in FIG. 28 to FIG. 29. FIG. 28 shows the results of the "cut resistance" and the "tire weight reduction ratio" obtained when "W1/W3" was changed while "G1" was set to 0.99 mm. FIG. 29 shows the results of the "cut resistance" and the "tire weight reduction ratio" obtained when "W1/W3" was changed while "G1" was set to 1.00 mm. FIG. 30 shows the results of the "cut resistance" and the "tire weight reduction ratio" obtained when "W1/W3" was changed while "G1" was set to 1.01 mm. FIG. 31 shows the results of the "cut resistance" and the "tire weight reduction ratio" obtained when "W1/W3" was changed while "G1" was set to 2.00 mm. FIG. 32 shows the results of the "cut resistance" and the "tire weight reduction ratio" obtained when "W1/W3" was changed while "G1" was set to 2.49 mm. FIG. 33 shows the results of the "cut resistance" and the "tire weight reduction ratio" obtained when "W1/W3" was changed while "G1" was set to 2.50 mm. FIG. 34 shows the results of the "cut resistance" and the "tire weight reduction ratio" obtained when "W1/W3" was changed while "G1" was set to 2.51 mm.

As illustrated in FIG. 28 to FIG. 34, it can be confirmed that both the "cut resistance" and the "tire weight reduction ratio" are poor when the condition (4) is not satisfied.

As illustrated in FIG. 29 to FIG. 33, it can be confirmed that both the "cut resistance" and the "tire weight reduction ratio" are excellent when the condition (3) is also satisfied in a state in which the condition (4) is satisfied.

Evaluation Test 3

Evaluation tests relating to the provision of the protrusion portions 100 in the "range of from 0.1×SH to 0.4×SH" with respect to the tire radial direction will now be described. In the evaluation tests, evaluation was carried out in order to check the "weight" and the "tire rigidity" for a case in which the "range of from 0.1×SH to 0.4×SH" is satisfied and a case in which the "range of from 0.1×SH to 0.4×SH" is not satisfied.

The evaluation of the "weight" and the "tire rigidity" was carried out for cases in which a value x by which the cross-sectional height SH was multiplied was set to "0.09", "0.10", "0.11", "0.39", "0.40", "0.41", "0.50", and "0.60".

In the evaluation test of the "weight", cases in which the weight of the tire 1 satisfies a specified value after increasing or decreasing the size of the protrusion portions 100 were determined as "Pass", and cases in which the weight does not satisfy the specified value were determined as "Fail".

In the evaluation test of the "tire rigidity", the tires 1 having each of the above-described conditions were mounted on the regular rims and inflated to the regular internal pressure. Thereafter, in a drum testing machine, the test was started at a speed of 120 km/h with a load of 5 kN. Then, every 24 hours, the speed was increased by 10 km/h until the tire 1 failed, and the distance traveled until the failure was measured. Then, on the basis of the measurement results, cases in which the travel distance satisfies a specified value were determined as "Pass", and cases in which the travel distance does not satisfy the specified value were determined as "Fail".

For the tires 1, the numbers of the protrusion portions 100 disposed in the tire circumferential direction were the same, and the short-direction maximum widths of the protrusion portions 100 were the same. The number of the protrusion portions 100 disposed in the tire circumferential direction was set to "30", and the short-direction maximum width of the protrusion portions 100 was set to "3.00 mm". Further, "W1/W3" was set to a value (0.9) that satisfies the above-described conditions (1) and (3), "G1/G2" was set to a value (0.5) that satisfies the above-described condition (2), and "G1" was set to a value (1.5 mm) that satisfies the above-described condition (4).

Results of the evaluation tests are shown in FIG. 35. As illustrated in FIG. 35, when the value x was larger than 0.4, the tire rigidity was excellent, but the weight exceeded the specified value. Further, when the value x was larger than 0.4, the weight increased, but no significant improvement in the tire rigidity was observed. Further, when the value x was smaller than 0.1, the weight of the tire 1 was reduced, but the tire rigidity did not satisfy the specified value. As a result, it can be confirmed that the deterioration in the rigidity reduction suppression function, which is a function of the protrusion portions 100, can be suppressed while suppressing the increase in the weight of the tire 1, as a result of the protrusion portions 100 satisfying the "range of from 0.1× SH to 0.4×SH" in the tire radial direction.

Evaluation Test 4

An evaluation test relating to the condition in which the number of the protrusion portions 100 disposed in the tire circumferential direction is set to be in "a range of from 10 to 50" will now be described. In the evaluation test, evaluation was carried out in order to check the "weight reduction" of the tire 1 and the "fuel efficiency" of the vehicle on which the tires 1 were mounted, for a case in which the number of protrusion portions 100 satisfies the condition of "a range of from 10 to 50" and a case in which the number of protrusion portions 100 does not satisfy the condition.

The evaluation was carried out for cases in which the number of protrusion portions 100 was "9", "10", "11", "49", "50", and "51".

In the evaluation test of the "weight reduction", cases in which the weight of the tire 1 satisfies a specified value after increasing or decreasing the number of the protrusion portions 100 were determined as "Pass", and cases in which the weight does not satisfy the specified value were determined as "Fail".

In the evaluation test of the "fuel efficiency", the tires 1 having each of the above-described conditions were mounted on the regular rims and inflated to the regular internal pressure, and mounted on a test vehicle. Thereafter, the test vehicle traveled at a speed of 40 km/h for a travel distance of 1000 km, and then, the fuel efficiency of the vehicle was measured. Then, on the basis of the measurement results, cases in which the fuel efficiency satisfies a specified value were determined as "Pass", and cases in which the fuel efficiency does not satisfy the specified value were determined as "Fail".

For the tires 1, the ranges in which the protrusion portions 100 were provided in the tire radial direction were the same, and the short-direction maximum widths of the protrusion portions 100 were the same. The range in which the protrusion portions 100 were provided in the tire radial direction was set to "0.3×SH", and the short-direction maximum width of the protrusion portions 100 was set to "3.00 mm". Further, "W1/W3" was set to a value (0.9) that satisfies the conditions (1) and (3), "G1/G2" was set to a value (0.5) that satisfies the condition (2), and "G1" was set to a value (1.5 mm) that satisfies the condition (4).

Results of the evaluation tests are shown in FIG. 36. As illustrated in FIG. 36, it was confirmed that the weight of the tire 1 did not satisfy the specified value, and the fuel efficiency also deteriorated in both cases in which the number of protrusion portions 100 is less than 10 and in which the number of protrusion portions 100 was more than 50.

Evaluation Test 5

An evaluation test of the condition in which the short-direction maximum width of the protrusion portions 100 is set to be in "a range of from 0.5 mm to 5.0 mm" will now be described. In the evaluation test, evaluation was carried out in order to check the "weight reduction" of the tire 1 and the "fuel efficiency" of the vehicle on which the tires 1 were mounted, for a case in which the short-direction maximum width of the protrusion portions 100 satisfies the condition of "a range of from 0.5 mm to 5.0 mm" and a case in which the width does not satisfy the condition.

Evaluation was carried out on the "weight reduction" and the "fuel efficiency" for cases in which the short-direction maximum width of the protrusion portions 100 is "0.49 mm", "0.50 mm", "4.99 mm", "5.00 mm", and "5.01 mm".

In the evaluation test of the "weight reduction", cases in which the weight of the tire 1 satisfies a specified value after increasing or decreasing the short-direction maximum width dimension of the protrusion portions 100 were determined as "Pass", and cases in which the weight does not satisfy the specified value were determined as "Fail".

In the evaluation test of the "fuel efficiency", the tires 1 having each of the above-described conditions were mounted on the regular rims and inflated to the regular internal pressure, and mounted on a test vehicle. Thereafter, the test vehicle traveled at a speed of 40 km/h for a travel distance of 1000 km, and then, the fuel efficiency of the vehicle was measured. Then, on the basis of the measurement results, cases in which the fuel efficiency satisfies a specified value were determined as "Pass", and cases in which the fuel efficiency does not satisfy the specified value were determined as "Fail".

For the tires 1, the ranges in which the protrusion portions 100 were provided in the tire radial direction were the same, and the numbers of the protrusion portions 100 disposed in the tire circumferential direction were the same. The range in which the protrusion portions 100 were provided in the tire radial direction was set to "0.3×SH", and the number of the protrusion portions 100 disposed in the tire circumferential direction was set to "30". Further, "W1/W3" was set to a value (0.9) that satisfies the condition (1) and (3), "G1/G2" was set to a value (0.5) that satisfies the condition (2), and "G1" was set to a value (1.5 mm) that satisfies the condition (4).

Results of the evaluation tests are shown in FIG. 37. As illustrated in FIG. 37, it was confirmed that the weight of the tire 1 does not satisfy the specified value, and the fuel efficiency also deteriorates in both cases in which the short-direction maximum width of the protrusion portions 100 is smaller than 0.5 mm and in which the width is larger than 5.0 mm.

The invention claimed is:

1. A pneumatic tire rotatable about a rotation axis, comprising:
   a tread portion;
   side portions disposed on both sides of the tread portion in a tire width direction;
   a bead portion including a bead core disposed on each side portion;
   a carcass including a carcass main body portion and a carcass folded back portion formed as a result of the carcass being folded back at the bead core in each bead portion;
   a side rubber connected to a carcass outer surface of the carcass main body portion in each side portion and including a side surface on which a tire maximum width position is positioned; and
   a plurality of protrusion portions connected to the side surface, the protrusion portions protruding from the side surface and being disposed in a tire circumferential direction, wherein
   the plurality of protrusion portions adjacent to each other are provided apart from each other in the tire circumferential direction and are connected via the side surface,
   at least one of the plurality of protrusion portions is connected to the side surface so as to include the tire maximum width position,
   each of the plurality of protrusion portions includes a first end portion and a second end portion disposed on an outer side of the first end portion in a tire radial direction, a distance between the first end portion and the second end portion is larger than a short-direction maximum width of the protrusion portions in a plane orthogonal to the rotation axis, and in a case that a tire center in the tire width direction is denoted as CL, an intersection point of a parallel line LP with the carcass outer surface is denoted as P1, the parallel line LP extending parallel with the rotation axis and passing through the tire maximum width position, an intersection point of the parallel line LP with the side surface is denoted as P2, an intersection point of the parallel line LP with a protrusion portion outer surface of the protrusion portion is denoted as P3 which is disposed in the outermost position in the tire width direction, a distance between the tire center CL and the intersection point P1 in a direction parallel with the rotation axis is denoted as W1, a distance between the tire center CL and the intersection point P2 in the direction parallel with the rotation axis is denoted as W2, a distance between the tire center CL and the intersection point P3 in the direction parallel with the rotation axis is denoted as W3, a distance between the intersection point P1 and the intersection point P2 is denoted as G1, and a distance between the intersection point P2 and the intersection point P3 is denoted as G2, conditions of $0.80 \leq W1/W3 \leq 0.95$ and $0.1 \leq G1/G2 \leq 1$ are satisfied.

2. The pneumatic tire according to claim 1, wherein all of the plurality of protrusion portions are connected to the side surface so as to include the tire maximum width position.

3. The pneumatic tire according to claim 1, wherein, in a case that a tire cross-sectional height indicating a distance between an innermost end portion and an outermost end portion in the tire radial direction is denoted as SH, the protrusion portions are provided in a range of from $0.1 \times SH$ to $0.4 \times SH$ in the tire radial direction.

4. The pneumatic tire according to claim 1, wherein the number of the protrusion portions disposed on the side surface in the tire circumferential direction is in a range of from 10 to 50.

5. The pneumatic tire according to claim 1, wherein the short-direction maximum width of the protrusion portions is in a range of from 0.5 mm to 5.0 mm.

6. The pneumatic tire according to claim 1, wherein a plurality of recessed portions are provided, in the side surface, between the protrusion portions adjacent to each other.

* * * * *